United States Patent
Ohwatari et al.

(10) Patent No.: US 9,485,003 B2
(45) Date of Patent: Nov. 1, 2016

(54) USER APPARATUS AND USER ASSIGNMENT INFORMATION ESTIMATION METHOD

(71) Applicant: NTT DOCOMO, INC., Tokyo (JP)

(72) Inventors: Yusuke Ohwatari, Tokyo (JP); Yousuke Sano, Tokyo (JP); Satoshi Nagata, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/779,021

(22) PCT Filed: Mar. 5, 2014

(86) PCT No.: PCT/JP2014/055686
§ 371 (c)(1),
(2) Date: Sep. 22, 2015

(87) PCT Pub. No.: WO2014/156526
PCT Pub. Date: Oct. 2, 2014

(65) Prior Publication Data
US 2016/0056878 A1    Feb. 25, 2016

(30) Foreign Application Priority Data

Mar. 29, 2013    (JP) ................................ 2013-071067

(51) Int. Cl.
*H04B 7/00* (2006.01)
*H04B 7/08* (2006.01)
(Continued)

(52) U.S. Cl.
CPC .............. *H04B 7/0857* (2013.01); *H04B 7/08* (2013.01); *H04J 11/005* (2013.01); *H04W 72/08* (2013.01)

(58) Field of Classification Search
CPC .............. H04B 7/0639; H04B 7/0626; H04B 1/71075; H04B 17/345; H04B 7/0632; H04B 1/7107; H04B 1/71072; H04B 17/309; H04B 1/1027; H04B 17/336

USPC ................. 455/501, 500, 517, 67.11, 67.13, 455/523–525, 63.1, 445, 403, 422.1, 426.1, 455/426.2, 550.1, 515, 522, 68, 69, 127.1, 455/127.2; 370/241, 252, 310, 328, 329, 370/338, 343
See application file for complete search history.

(56) References Cited

U.S. PATENT DOCUMENTS

2008/0102822 A1*   5/2008   Feng .................. H04W 72/082
                                                                455/425

FOREIGN PATENT DOCUMENTS

WO        2014/103455 A1      7/2014

OTHER PUBLICATIONS

International Search Report issued in corresponding application No. PCT/JP2014/055686 mailed Apr. 15, 2014 (2 pages).
(Continued)

*Primary Examiner* — Keith Ferguson
(74) *Attorney, Agent, or Firm* — Osha Liang LLP

(57) ABSTRACT

A user apparatus that is used in a radio communication system including a plurality of base stations, and that includes a function for performing interference reduction based on user assignment in an interference cell, including: interference pattern generation means that generates a plurality of interference patterns each of which is a combination of presence or absence of an interference signal in a given number of interference cells for the user apparatus; reception quality calculation means that calculates a reception quality after interference reduction for each of the plurality of interference patterns generated by the interference pattern generation means; and user assignment information estimation means that determines presence or absence of an interference signal in each interference cell corresponding to an interference pattern based on which the best reception quality is obtained in reception qualities calculated by the reception quality calculation means to be presence or absence of user assignment.

19 Claims, 31 Drawing Sheets

(51) Int. Cl.
*H04W 72/08* (2009.01)
*H04J 11/00* (2006.01)

(56) References Cited

OTHER PUBLICATIONS

Yusuke Ohwatari et al.; "Performance of Advanced Receiver Employing Interference Rejection Combining to Suppress Inter-cell Interference in LTE-Advanced Downlink"; Proc. VTC2011-Fall, Sep. 2011 (7 pages).

NTT Docomo; "Reference receiver structure for interference mitigation on Enhanced performance requirement for LTE UE"; 3GPP TSG-RAN WG4 #60Bis, R4-115213, Zhuhai, CN; Oct. 10-14, 2011 (3 pages).

Written Opinion issued in corresponding application No. PCT/JP2014/055686 mailed Apr. 15, 2014 (3 pages).

* cited by examiner

- TYPE 1: IN A CASE WHERE CHANNEL OF INTERFERENCE SIGNAL CAN BE ESTIMATED $$W_{IRC} = \frac{P_{00}}{N_{Stream,00}} \hat{G}_{00}^H(k,l) \left( \sum_{i=0}^{N_{cell}-1} \sum_{j=0}^{N_{user}-1} \frac{P_{ij}}{N_{Stream,ij}} \hat{G}_{ij}(k,l) \hat{G}_{ij}^H(k,l) + \sigma_N^2 I \right)^{-1}$$

→ COVARIANCE MATRIX FORMED BY CHANNEL MATRIX OF INTERFERENCE CELL

⇦ INTERFERENCE SUPPRESSION ABILITY IS HIGHER IN TYPE 1

- TYPE 2: IN A CASE WHERE CHANNEL OF INTERFERENCE SIGNAL CANNOT BE ESTIMATED $$W_{IRC} = \frac{P_{00}}{N_{Stream,00}} \hat{G}_{00}^H(k,l) \left( \hat{G}_{00}(k,l) \hat{G}_{00}^H(k,l) + \hat{R}_{I+N} \right)^{-1}$$

→ COVARIANCE MATRIX (STATISTICAL VALUE) OF NOISE INTERFERENCE COMPONENT ESTIMATED FROM REFERENCE SIGNAL FROM CONNECTING CELL $G_{ij}$ : CHANNEL MATRIX AFTER MULTIPLICATION OF TRANSMISSION WEIGHT MATRIX OF $j$-TH UE ON THE SAME RESOURCE IN $i$-TH CELL (THE NUMBER OF ANTENNAs × THE NUMBER OF TRANSMISSION STREAMs)

$\hat{G}_{ij}$ : THE CHANNEL MATRIX ESTIMATION VALUE BY REFERENCE SIGNAL $P_{ij}$ : TRANSMISSION POWER OF $j$-TH UE IN $i$-TH CELL $N_{Stream,ij}$ : THE NUMBER OF TRANSMISSION STREAMs OF $j$-TH UE IN $i$-TH CELL $\sigma_N^2$ : NOISE POWER $k$ : SUBCARRIER INDEX $l$ : OFDM SYMBOL INDEX

| | CRS | CSI-RS | DM-RS |
|---|---|---|---|
| TARGET RELEASE | ON OR AFTER LTE RELEASE 8 | ON OR AFTER LTE RELEASE 10 | ON OR AFTER LTE RELEASE 9 |
| ESTIMATION TARGET CHANNEL | CHANNEL MATRIX FOR EACH TRANSMISSION ANTENNA BEFORE PRECODING TRANSMISSION (CELL SPECIFIC REFERENCE SIGNAL) | CHANNEL MATRIX FOR EACH TRANSMISSION ANTENNA BEFORE PRECODING TRANSMISSION | CHANNEL MATRIX FOR EACH TRANSMISSION ANTENNA AFTER PRECODING TRANSMISSION (USER SPECIFIC REFERENCE SIGNAL) |
| TRANSMISSION BANDWIDTH | WHOLE BAND | WHOLE BAND | TRANSMISSION BANDWIDTH OF USER |
| TRANSMISSION METHOD | TRANSMIT INDEPENDENTLY FOR EACH TRANSMISSION ANTENNA (FDM/TDM) | TRANSMIT BY CODE MULTIPLEXING EVERY TWO ANTENNAs. TRANSMIT BY FREQUENCY DIVISION-MULTIPLEXING BETWEEN DIFFERENT TWO TRANSMISSION ANTENNA PAIRs (FDM/CDM). | TRANSMIT BY CODE MULTIPLEXING EVERY TWO OR FOUR TRANSMISSION STREAMs. TRANSMIT BY FREQUENCY DIVISION-MULTIPLEXING BETWEEN DIFFERENT TWO OR FOUR TRANSMISSION STREAM PAIRs (FDM/CDM). |
| TRANSMISSION WEIGHT MATRIX | IT IS NECESSARY TO ESTIMATE OR NOTIFY SEPARATELY | IT IS NECESSARY TO ESTIMATE OR NOTIFY SEPARATELY | IT IS POSSIBLE TO ESTIMATE CHANNEL MATRIX INCLUDING TRANSMISSION WEIGHT MATRIX → SIMULTANEOUS ESTIMATION OF TRANSMISSION WEIGHT AND CHANNEL |

| INTERFERENCE PATTERN | INTERFERENCE CELL #1 | INTERFERENCE CELL #2 |
|---|---|---|
| 1 | INTERFERENCE ABSENT | INTERFERENCE ABSENT |
| 2 | INTERFERENCE ABSENT | INTERFERENCE PRESENT |
| 3 | INTERFERENCE PRESENT | INTERFERENCE ABSENT |
| 4 | INTERFERENCE PRESENT | INTERFERENCE PRESENT |

| INTERFERENCE PATTERN | INTERFERENCE CELL #1 |
|---|---|
| 1 | INTERFERENCE ABSENT |
| 2 | INTERFERENCE PRESENT |

CALCULATION OF PART B
— WHEN ESTIMATING BY CSI-RS

FIG.16

- CORRESPONDING TO $n$-TH TRANSMISSION STREAM, $k$-TH SUBCARRIER, $l$-TH OFDM SYMBOL

- $(1 \times N_{Rx})$ DIMENTIONAL RECEPTION WEIGHT VECTOR FOR $n$-TH TRANSMISSION STREAM OF DESIRED SIGNAL $$\hat{w}_{Rx,n,0}(k,l) = (\hat{H}_0(k,l)\hat{w}_{Tx,n,0}(k,l))^H (\hat{H}_0(k,l)\hat{w}_{Tx,0}(k,l)\hat{w}_{Tx,0}^H(k,l)\hat{H}_0^H(k,l) + \sigma_N^2 I)^{-1}$$

$$SINR_{out,n}(k,l) = \frac{\dfrac{P_0}{N_{Stream,0}} \hat{w}_{Rx,n,0}(k,l) \hat{H}_0(k,l) \hat{w}_{Tx,n,0}(k,l) \hat{w}_{Tx,n,0}^H(k,l) \hat{H}_0^H(k,l) \hat{w}_{Rx,n,0}^H(k,l)}{\hat{w}_{Rx,n,0}(k,l)(\underbrace{\hat{R}_{intra} + \hat{\sigma}_{I_{inter}+N,n}^2 I}_{(C)})\hat{w}_{Rx,n,0}^H(k,l)}$$

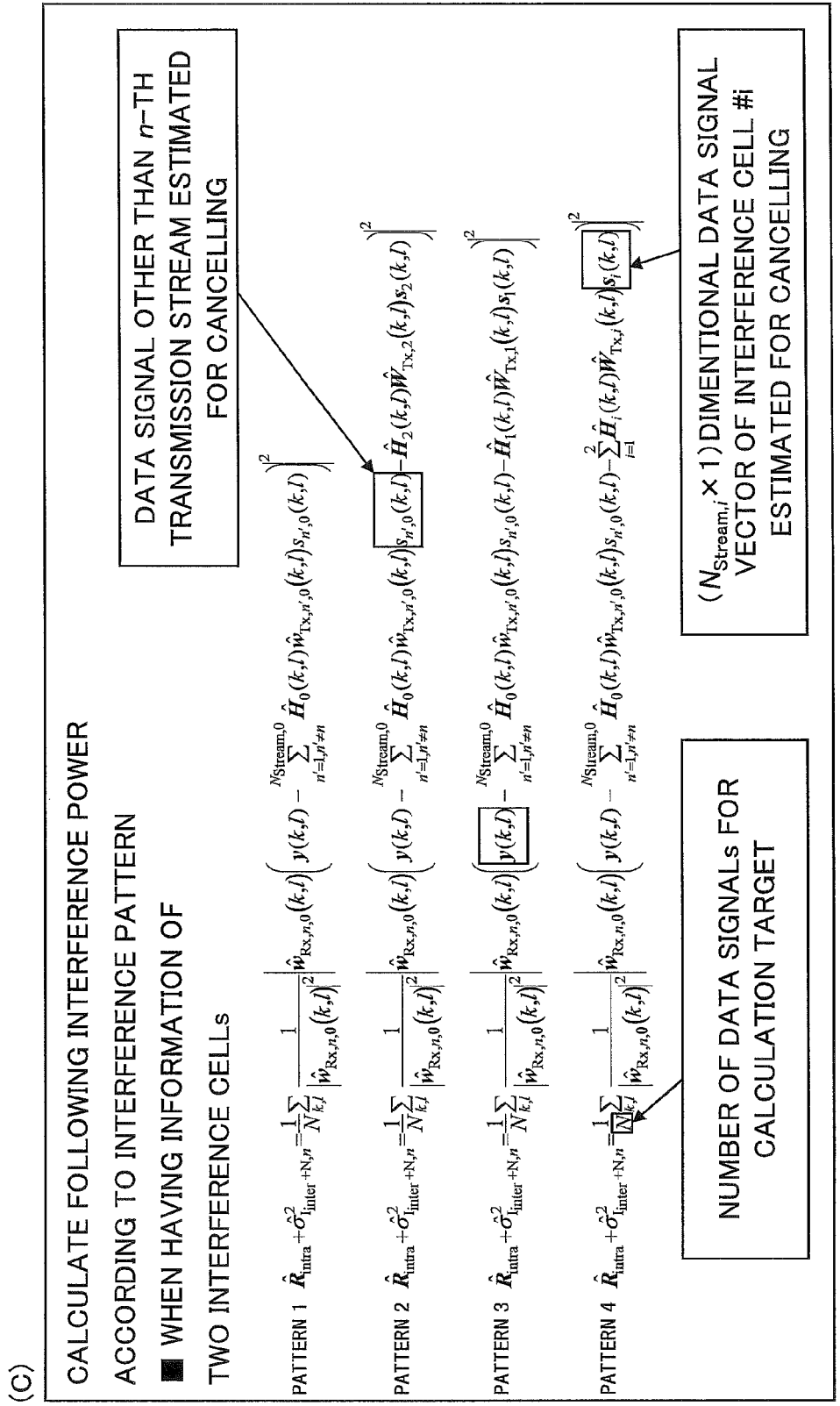

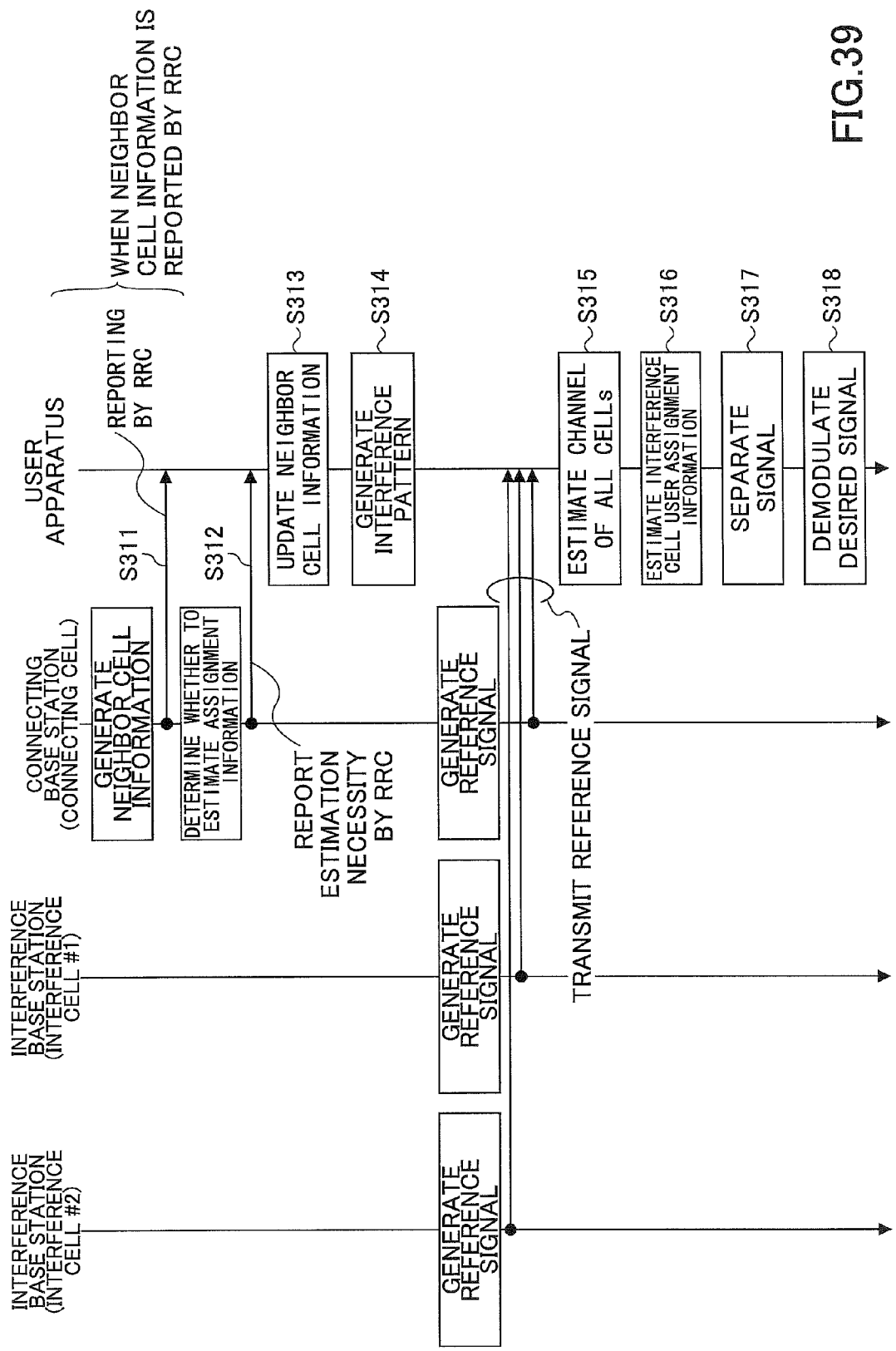

USER APPARATUS AND USER ASSIGNMENT INFORMATION ESTIMATION METHOD

TECHNICAL FIELD

The present invention relates to a technique of interference reduction in a user apparatus of a radio communication system.

BACKGROUND ART

In LTE (Long Term Evolution) Advanced in 3GPP (Third Generation Partnership Project), OFDMA (Orthogonal Frequency Division Multiplexing Access) using MU-MIMO (multi-user multiple-input multiple-output) is proposed. In downlink transmission of MU-MIMO, one base station can communicate with a plurality of user apparatuses, and in addition to that, the base station can also transmit different data streams (layers) to one user apparatus at the same time.

Also, in the LTE-Advanced, in the downlink communication, various techniques are considered for reducing (suppressing, removing, for example), at the user apparatus, interference of an interference radio beam from an interference base station against a desired radio beam from a connecting base station, and interference of signals to other users at the connecting base station.

In the technique for reducing such interferences, for example, as shown in FIG. 1, in a case where a user apparatus 10 resides near a border of a connecting cell (cell of a connecting base station 1, serving cell), so the user apparatus 10 strongly receives an interference radio beam from another base station 2 (interference base station) adjacent to the desired base station 1, the user apparatus 10 can improve reception quality of the desired signal carried on a desired radio beam by performing interference reduction processing. In FIG. 1, a beam generated by the interference base station 2, that is, a part of beams for a downlink channel to other user apparatus (user apparatus 11, for example) becomes an interference signal for the user apparatus 10. FIG. 1 especially shows interference from an interference cell.

RELATED ART DOCUMENT

Non-Patent Document

[NON-PATENT DOCUMENT 1] Y. Ohwatari, N. Miki, T. Asai, T. Abe, and H. Taoka, "Performance of Advanced Receiver Employing Interference Rejection Combining to Suppress Inter-cell Interference in LTE-Advanced Downlink," in Proc. VTC2011-Fall, September 2011.

[NON-PATENT DOCUMENT 2] 3GPP, R4-115213, NTT DOCOMO, "Reference receiver structure for interference mitigation on Enhanced performance requirement for LTE UE," October 2011.

SUMMARY OF THE INVENTION

Problem to be Solved by the Invention

In the following, outlines of techniques for interference reduction such as interference rejection and removing and the like in a conventional technique are described, and a problem to be solved by the present invention is described.

<Interference Rejection Combining Reception>

There is a technique called Interference Rejection Combining as one of techniques for separating a desired signal from a received signal that includes an interference signal and the desired signal to obtain the desired signal. The interference rejection combining (IRC) is a technique for weighting (reception weights) signals that are obtained by each reception antenna in the user apparatus so as to suppress, in the user apparatus, interference of the interference radio beam from the interference base station against the desired radio beam from the connecting base station, and the interference by signals for other users at the connecting base station in the downlink communication. For example, in the case shown in FIG. 1, the user apparatus 10 performs directivity control (weight control) to direct a beam to a desired signal from the connecting base station 1, and direct null to an interference signal from the interference base station 2 so as to perform interference rejection.

As shown in FIG. 2, in the IRC reception technique, there are two types (Type 1, Type 2) of methods for calculating reception weights, which are a type for a case where the channel of the interference signal can be estimated, and a type for a case where the estimation of the channel of the interference signal is impossible. By the way, each of the equations shown in FIG. 2 is an equation derived from an MMSE (Minimum Mean. Squared Error) algorithm. Also, the technique for calculating reception weights using these equations is an existing technique in itself.

As shown in FIG. 2, in the equation of Type 1 for the case where channel estimation of the interference signal is possible, the underlined part is a covariance matrix formed by a channel matrix of the interference cell. Also, in the equation of Type 2 for the case where channel estimation of the interference signal is impossible, the underlined part is a covariance matrix (statistical amount) of noise interference components estimated by a received signal from the connecting cell (cell formed by the connecting base station, a serving cell).

<Successive Interference Cancellation>

In addition to IRC, there is a technique of successive interference cancellation (SIC) as a technique for separating a desired signal from a received signal including an interference signal and the desired signal.

The successive interference cancellation is a technique for generating a replica signal by performing hard decision or soft decision for the interference signal from the received signal, and successively subtracting (removing) the replica signal from the received signal so as to extract a desired signal. A functional block diagram is shown in FIG. 3 when the user apparatus performs the successive interference cancellation. As shown in FIG. 3, for each of a plurality of interference signals, the user apparatus performs channel estimation of the interference signal, demodulates the interference signal based on the channel estimation, generates a replica of the interference signal, and successively subtracts the interference signal from the received signal. This configuration is merely an example for performing successive interference cancellation. The configuration of the successive interference canceller in itself is a conventional technique. The present invention can be applied to any successive interference canceller, irrespective of the scheme, as long as it includes a function for performing channel estimation of the interference cell and performing demodulation of the interference signal.

Since it is assumed that the present invention is applied to IRC Type 1 and SIC having high interference reduction capability, the problem of the present invention is described by describing information necessary for these in the following.

<Necessary Information for IRC Type 1/SIC>

For generating IRC reception weights in IRC Type 1, a channel matrix for the interference signal is necessary in addition to channel information of the desired signal. The channel matrix can be obtained by estimating a channel by using a reference signal from the interference cell. Also, in order to perform (SIC) successive interference cancellation, it is necessary to generate a replica signal for every interference signal. For achieving this, a channel matrix for each interference signal is necessary similarly to IRC Type 1.

In the LTE-Advanced, as reference signals that can be used for channel estimation, there are CRS (Cell-specific Reference Signal), CSI-RS (CSI Reference Signal), and DM-RS (DeModulation Reference Signal, or UE specific Reference Signal).

FIG. 4 shows a mapping example of each reference signal, and FIG. 5 shows characteristics of each reference signal. As shown in FIG. 5, main difference between the characteristics is that precoding transmission is not performed for CRS and CSI-RS, and precoding transmission is performed for DM-RS. That is, in a case where precoding transmission is performed in the base station side, precoding information (PMI) is necessary for obtaining a channel matrix by using CRS or CSI-RS. When using DM-RS, a channel matrix including precoding information (PMI) can be directly estimated. As to the information that becomes necessary separately, it can be considered to report it from the network to the user apparatus as is proposed in Japanese patent application No. 2012-288896 which is an earlier application.

In a case where the channel matrix is obtained by performing channel estimation for the interference signal using CRS or CSI-RS, user assignment information in the interference signal is necessary in addition to the channel matrix for performing IRC Type 1/SIC. The reason is as follows.

For a user apparatus in a connecting cell, when a user is assigned to a resource (example: resource block (RB) of PDSCH) in an interference cell, the signal of the resource becomes an interference signal. Therefore, a user apparatus performing IRC Type 1/SIC calculates IRC weights so as to direct null only to the interference signal that is assigned to a user, or cancels the interference signal.

That is, as shown in FIG. 6, a signal from the interference cell at a resource the same as a resource assigned to the user apparatus for data reception in the connecting cell becomes an interference signal. Thus, it is necessary to suppress/cancel this interference signal.

However, since CRS and CSI-RS are transmitted by the whole band irrespective of presence or absence of user assignment, user assignment information cannot be obtained from CRS or CSI-RS. Thus, user assignment information is separately necessary.

As mentioned above, it is necessary to obtain user assignment information for the user apparatus to execute IRC Type1/SIC. Here, since the base station generates user assignment information, it can be considered to report user assignment information from the base station to the user apparatus. However, user assignment is basically performed for each RB for each user apparatus. Thus, when the user assignment information is reported from the base station to the user apparatus, there is a concern of increase of downlink overhead due to a large amount of the information.

The present invention is contrived in view of the above-mentioned point, and an object is to provide a technique that enables a user apparatus to estimate user assignment information of an interference cell used for performing interference reduction processes.

Means for Solving the Problem

For solving the problem, according to an embodiment of the present invention, there is provided a user apparatus that is used in a radio communication system including a plurality of base stations, and that includes a function for performing interference reduction based on user assignment in an interference cell, including:

interference pattern generation means that generates a plurality of interference patterns each of which is a combination of presence or absence of an interference signal in a given number of interference cells for the user apparatus;

reception quality calculation means that calculates a reception quality after interference reduction for each of the plurality of interference patterns generated by the interference pattern generation means; and user assignment information estimation means that determines presence or absence of an interference signal in each interference cell corresponding to an interference pattern based on which the best reception quality is obtained in reception qualities calculated by the reception quality calculation means to be presence or absence of user assignment.

For example, the interference pattern generation means restricts the number of interference cells for which the interference pattern is to be generated based on a size of interference power from interference cells. Also, the interference pattern generation means may be configured to generate the interference patter by further using a pattern of precoding information that can be used in an interference cell, and the user assignment information estimation means may be configured to estimate presence or absence of the user assignment and precoding information in each interference cell According to an embodiment of the present invention, there is provided a user apparatus that is used in a radio communication system including a plurality of base stations, and that includes a function for performing interference reduction based on user assignment in an interference cell, including:

interference noise power calculation means that calculates a whole interference noise power for the user apparatus;

interference cell power calculation means that calculates an interference power for each of a given number of interference cells for the user apparatus;

user assignment information estimation means that compares the whole interference noise power calculated by the interference noise power calculation means with the interference power of each interference cell calculated by the interference cell power calculation means so as to estimate presence or absence of user assignment of each interference cell based on magnitude relation of them.

Also, according to an embodiment of the present invention, there is provided a user apparatus that is used in a radio communication system including a plurality of base stations, and that includes a function for performing interference reduction based on user assignment in an interference base station, including:

covariance matrix calculation means that calculates a covariance matrix of whole interference cells for the user apparatus;

interference cell covariance matrix calculation means that calculates a covariance matrix for each of a given number of interference cells for the user apparatus; and user assignment information estimation means that estimates presence or absence of user assignment of each interference cell based on a result of predetermined calculation by using the covariance matrix of the whole interference cells calculated by the covariance matrix calculation means and the covariance matrix of each interference cell calculated by the interference cell covariance matrix calculation means.

The interference cell covariance matrix calculation means may be configured to calculate the covariance matrix by using each of a plurality of pieces of precoding information that can be used in an interference cell, and the user assignment information estimation means may be configured to estimate presence or absence of the user assignment and the precoding information of each interference cell.

The user apparatus may include interference cell number restriction means that restricts the number of interference cells that become targets of interference power calculation or covariance matrix calculation based on a size of interference power from interference cells. Also, the user apparatus may include estimation determination means that determines whether to perform estimation of presence or absence of user assignment based on information reported from a base station.

Effect of the Present Invention

According to the present invention, it becomes possible for a user apparatus to estimate user assignment information of an interference cell used for performing interference reduction processes. Accordingly, for example, it becomes possible to realize rejection or cancelling of the interference signal in high accuracy without increasing overhead of the downlink control signal, for example.

BRIEF DESCRIPTION OF THE DRAWINGS

FIG. 2 is a diagram for explaining interference rejection combining (IRC) reception;
FIG. 5 is a diagram showing characteristics of each reference signal;
FIG. 16 is a diagram showing a calculation method example of reception quality after interference rejection;
FIG. 17 is a diagram showing a calculation method example of reception quality after interference rejection;
FIG. 39 is a sequence diagram showing operation on the user apparatus 310 in the third embodiment.

EMBODIMENTS FOR CARRYING OUT THE INVENTION

Figure 1:
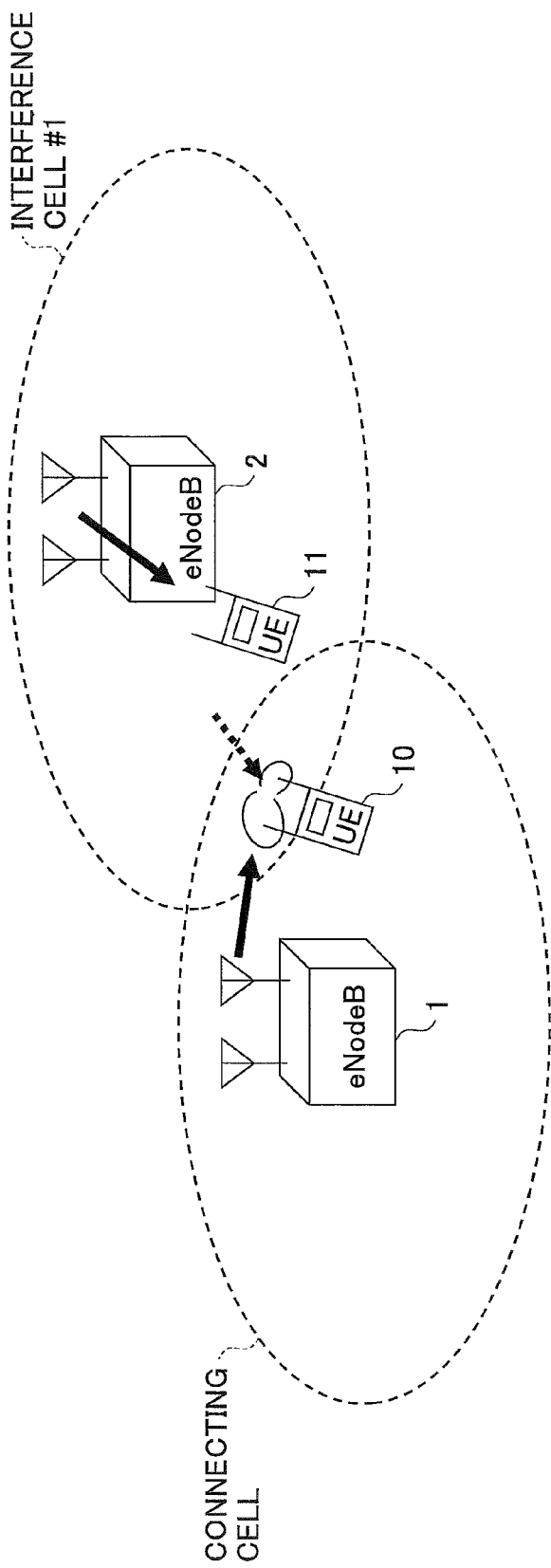
FIG. 1 is a diagram for explaining reduction of an interference from an interference cell.
Figure 3:
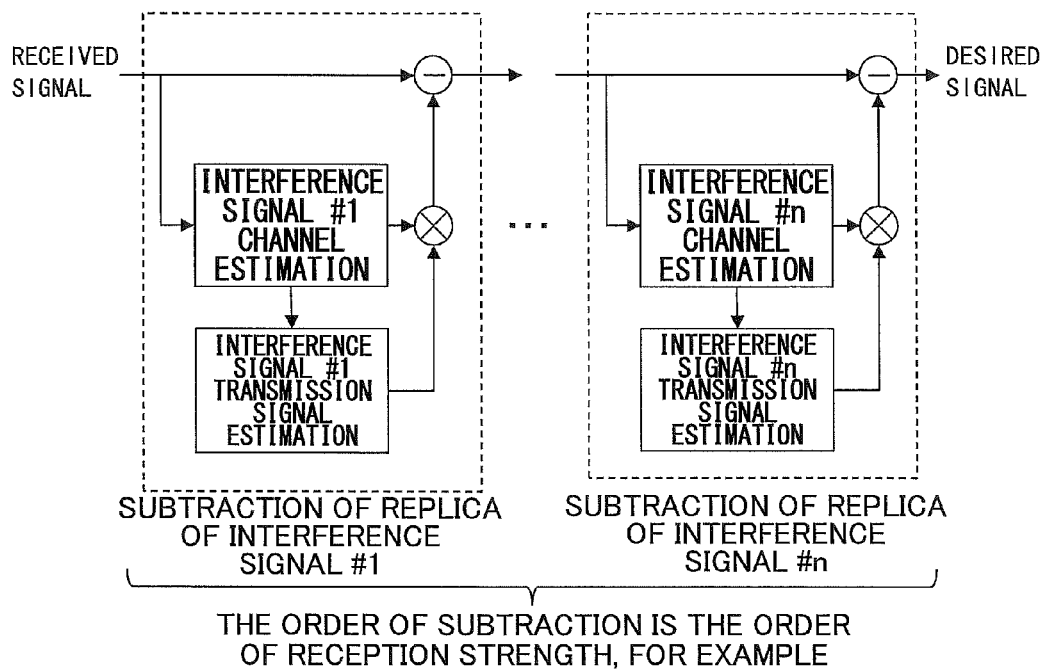
FIG. 3 is a block diagram showing a functional configuration example of a user apparatus that performs SIC.
Figure 4:
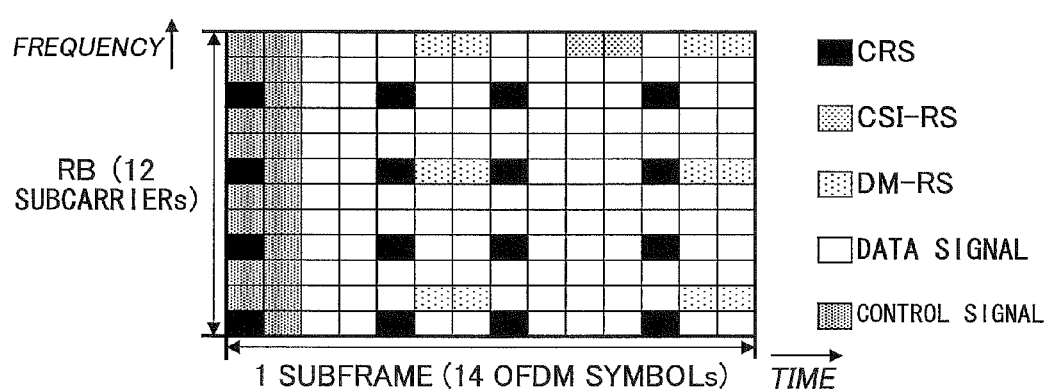
FIG. 4 is a diagram showing a mapping example of each reference signal.
Figure 6:
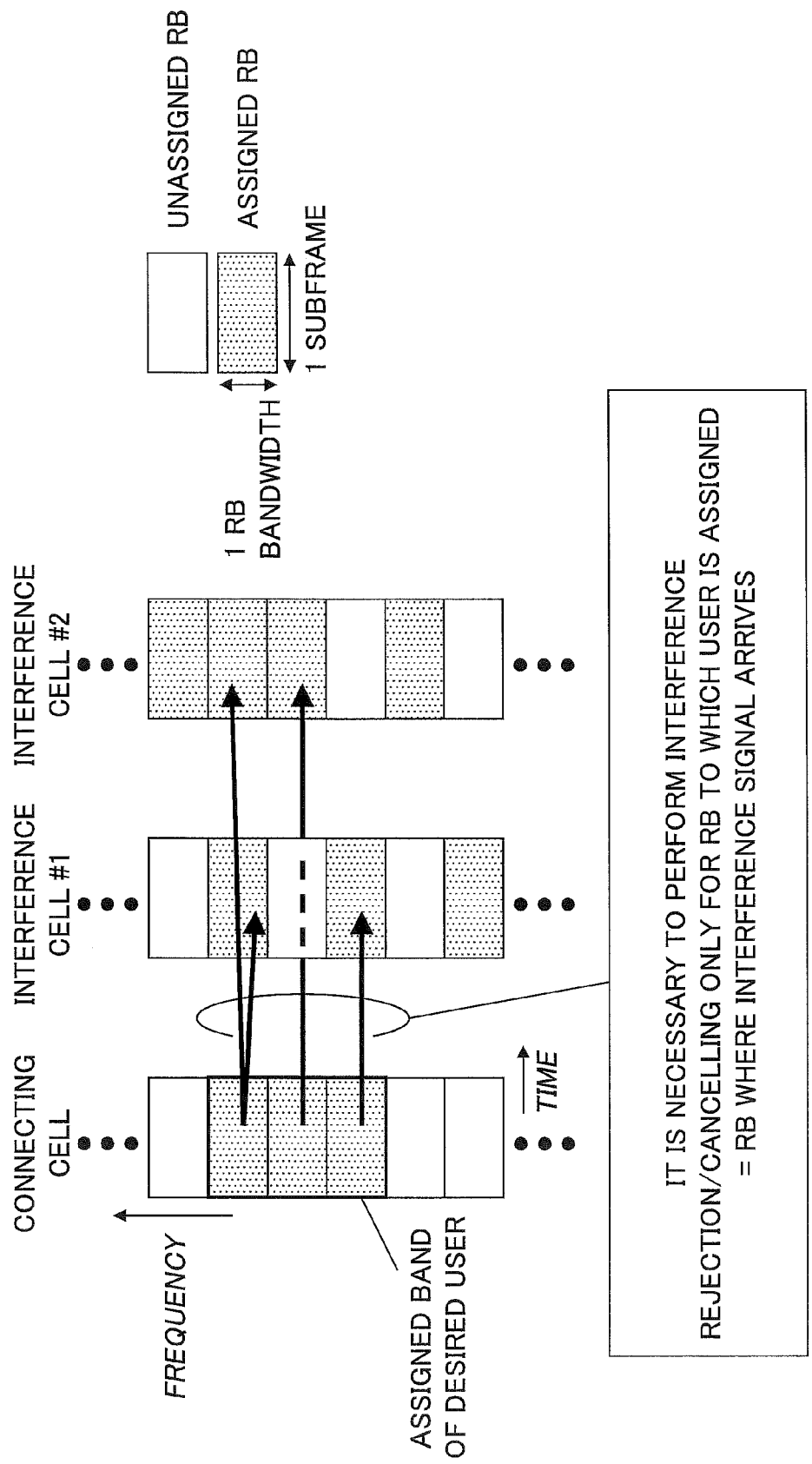
FIG. 6 is a diagram for explaining necessity of user assignment information in interference reduction.

In the following, embodiments of the present invention are described with reference to figures. The embodiments described below are merely examples, and the embodiments to which the present invention is applied are not limited to the embodiments below. In the following, interference rejection/cancelling are collectively described as interference reduction.

The user apparatus in embodiments of the present invention is assumed to be a mobile communication terminal such as a mobile phone, a smart phone and the like. But, the user apparatus is not limited to these. Also, a mobile communication network to which the user apparatus connects in the present embodiment is a network complying with LTE. But, a network to which the present invention can be applied is not limited to this. The term "LTE" in the present embodiments is used as a term having a meaning including not only communication schemes corresponding to release 8 or 9 of 3GPP, but also communication schemes corresponding to release 10, 11, or 12 of 3GPP.

In the following, an embodiment in which user assignment information is estimated based on reception quality after interference reduction is described as a first embodiment, an embodiment in which user assignment information is estimated based on interference noise power and interference power/covariance matrix of interference cells before interference reduction is described as a second embodiment, and an embodiment in which a base station reports, to a user apparatus, information indicating whether to perform estimation of user assignment information or not is described as a third embodiment.

(First Embodiment)

EXAMPLE 1-1

Basic Process Example

First, content of basic processes performed by the user apparatus in the first embodiment is described as an example 1-1. In the present embodiment, the user apparatus calculates a reception quality (output SINR) after interference reduction, for each RB, for every pattern of interference signals so as to estimate presence or absence of an interference signal based on superiority or inferiority of the reception quality in each calculated pattern. In the present embodiment, the reception quality (output SINR) after interference reduction can be calculated by utilizing a channel estimation value which uses CRS, or CSI-RS, or DM-RS or a combination of a plurality of any ones of these. Although there are various methods as methods for calculating the reception quality (output SINR) after interference reduction, an example is described later.

Since the user apparatus has neighbor cell information used for handover, the user apparatus ascertains interference cells by using the neighbor cell information to generate patterns of interference signals. Also, neighbor cell information may be reported semi-statically by downlink RRC from the base station, so that the user apparatus may generate the pattern of the interference signals by using the neighbor cell information. Then, the user apparatus calculates, for each RB, the reception quality (output SINR) after interference reduction for every pattern, and estimates presence or absence of an interference signal, that is, presence or absence of user assignment for each interference cell from an interference pattern which becomes the largest (best) reception quality, for example.

The base station may send, to the user apparatus, interference cell IDs indicating cells which are targets of interference reduction, so that the user apparatus may generate patterns of interference cells of the reported interference cell IDs so as to determine presence or absence of an interference signal for each interference cell.

Figures 7, 8:
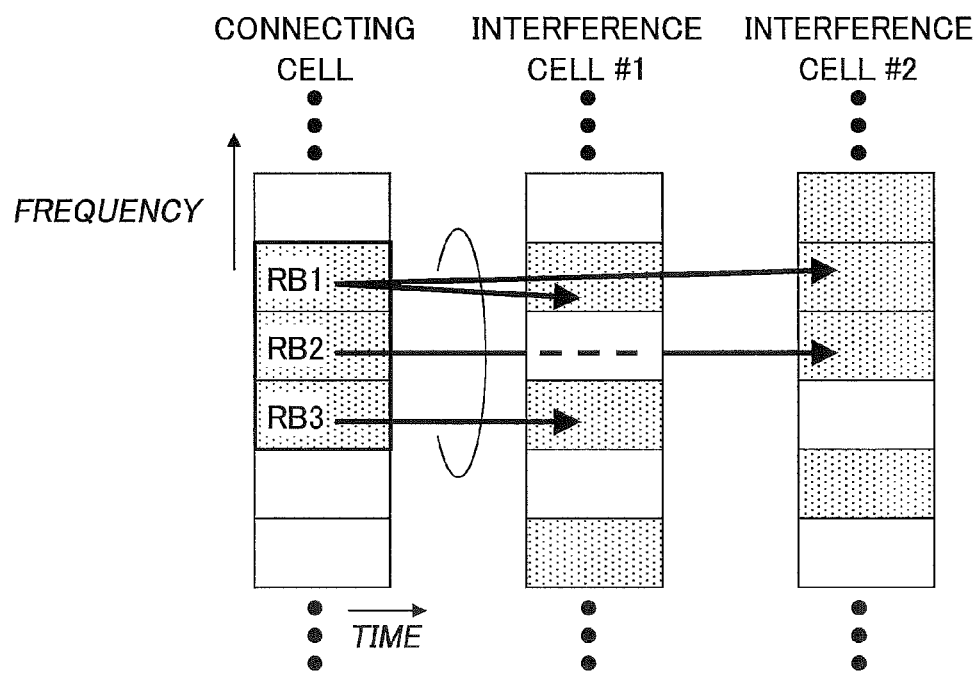
FIG. 7 is a diagram showing examples of interference patterns.
FIG. 8 is a diagram for explaining a concrete example of presence or absence of user assignment.

More concrete process content is described with reference to FIGS. 7 and 8. This example is an example in which the user apparatus has neighbor cell information for two cells (interference cell#1 and interference cell#2 ). FIG. 7 shows patterns of interference signals generated by the user apparatus. As shown in FIG. 7, a combination of presence/absence of interference (=presence/absence of user assignment) for the two cells forms one interference pattern, and 4 patterns are generated in total.

Then, the user apparatus calculates a reception quality after interference reduction assuming the 4 patterns shown in FIG. 7 for each RB. For example, as to the case of pattern 2, the reception quality after interference reduction (after interference reduction for interference cell #2 in this case) is calculated by assuming that there is no interference in the interference cell #1 and that there is interference in the interference cell #2 . The user apparatus estimates presence or absence of an interference signal (presence or absence of user assignment) based on a pattern which becomes the largest reception quality in the 4 patterns.

FIG. 8 shows a concrete example of presence or absence of user assignment. In FIG. 8, the shaded area indicates a RB where user is assigned. That is, the shaded area of the interference cell is a RB that becomes interference for the user apparatus of the connecting cell.

For example, in a case where the pattern 4 becomes the largest as a result of calculation of reception quality, it can be estimated that interference exists for both of the interference cells #1 and #2 like RB1 shown in FIG. 8. In a case where the pattern 2 becomes the largest as a result of calculation of reception quality, it can be estimated that no interference exists in the interference cell #1 and interference exists in the interference cell #2 like RB2 shown in FIG. 8. In a case where the pattern 3 becomes the largest as a result of calculation of reception quality, it can be estimated that interference exists in the interference cell #1 and no interference exists in the interference cell #2 like RB3 shown in FIG. 8.

EXAMPLE 1-2

Reduction of the Number of Interference Patterns

As mentioned above, it is possible to generate patterns for all interference cells included in the neighbor cell information to perform user assignment estimation. But, when the number of interference cells are large, the number of interference patterns increases so that the calculation amount increases. Thus, calculation of reception quality may be performed by restricting the number of interference patterns.

For restricting the number of interference patterns, for example, cells are limited to top several cells of large interference power based on neighbor cell power which the user apparatus has for handover. The number of the top several cells is predetermined. For the limited number of interference cells, interference patterns are generated as mentioned before so as to calculate a reception quality for each pattern.

Also, the maximum number of cells may be predetermined so that cells may be limited to the maximum number of cells in a descending order of interference power. Also, an interference power threshold may be predetermined so that cells may be limited to cells having interference power equal to or greater than the interference power threshold. Also, interference cells may be limited by combining these.

Further, the base station reports the number of interference cells to the user apparatus by RRC signaling, for example, so that the user apparatus may generate patterns of interference cells narrowed down to the number of cells. In this case, the cells may be narrowed down arbitrarily or cells of the number of the interference cells may be selected in an descending order of the interference power. Also, for example, cells may be limited to the number of transmission points included in RRC signaling for CoMP defined in release 11 of LTE, for example.

As to an interference cell not included in the interference pattern, it is determined that there is not a large effect of interference from the cell. That is, as to the interference cell that is not included in the interference pattern, the user apparatus may perform the process of interference reduction by assuming that a user is always assigned to the cell or a user is not assigned to the cell at any time. Handling for the interference cell not included in the interference pattern is not limited to this example.

A concrete example of reduction of the number of interference patterns is described with reference to FIG. 9. This example is an example in which the number of actual interference cells indicated by neighbor cell information is two (interference cell #1 and interference cell #2), and the number of the interference cell for generating the interference pattern is limited to one at the maximum. In this case, for example, since interference power of the interference cell #1 is greater than that of the interference cell #2, it is assumed that the user apparatus has selected the interference cell #1 as the one interference cell.

Figures 9, 10:
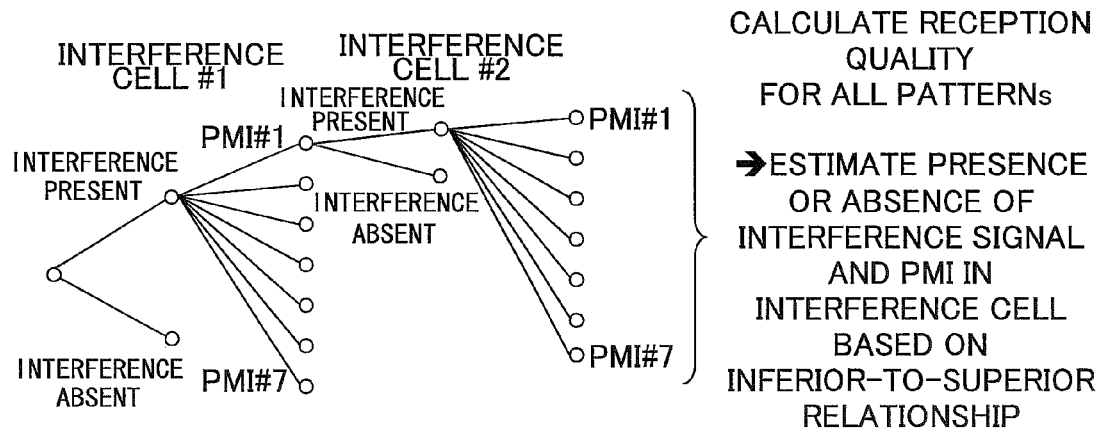
FIG. 9 is a diagram showing examples of interference patterns from which the number of interference patterns are reduced.
FIG. 10 is a diagram showing examples of interference patterns in which PMI/RI is considered.

In this case, as shown in FIG. 9, as to the interference cell #1, two patterns of interference present/absent (=user assignment present/absent) are generated in total.

Then, the user apparatus calculates reception quality after interference reduction for each RB by assuming there are two patterns shown in FIG. 9, so as to estimate presence or absence of an interference signal (presence or absence of user assignment) based on a pattern that becomes the largest reception quality in the two patterns.

A concrete example of presence or absence of user assignment is described with reference to FIG. 8. For example, in a case where pattern 1 becomes the largest as a result of calculation of the reception quality, it can be estimated that interference (user assignment) does not exist in the interference cell #1 like RB2 shown in FIG. 8. In a case where pattern 2 becomes the largest as a result of calculation of the reception quality, it can be estimated that interference exists in the interference cell #1 like RB 1 and RB3 shown in FIG. 8. It is assumed that a user is always assigned to the interference cell #2 by assuming that interference from the interference cell #2 does not have a large effect.

EXAMPLE 1-3

Estimation in Consideration of PMI/RI

Next, an example 1-3 is described. The Example 1-3 can be carried out together with the Example 1-2.

When using CRS or CSI-RS that is not precoded, the user apparatus may calculate reception quality (output SINR) by estimating PMI (Precoding Matrix Indicator, transmission weight matrix) and RI (Rank Indicator, rank (indicating the number of transmission layers)) in an interference cell. That is, in this example, the user apparatus estimates the reception quality by considering all of possible PMI/RI patterns.

However, in a case where all of the PMI/RI patterns are blindly considered, the number of patterns becomes large so that the calculation amount increases. Thus, by focusing on the fact that the number of patterns of PMI/RI is limited based on the number of transmission antennas of the base station, the number of patterns may be restricted based on the number of antennas. For example, when the number of transmission antennas of the base station is 4, each of code book sizes for rank 1, 2, 3 and 4 is 16, so that the number of patters becomes 64 in total. When the number of transmission antennas of the base station is 2, code book size of rank 1 is 4, and code book size of rank 2 is 3, so that the number of patters becomes 7 in total.

In this example, for example, the connecting base station reports the number of transmission antennas of interference cells to the user apparatus semi-statically by downlink RRC, so that the user apparatus calculates reception quality in consideration of the pattern corresponding to the number of transmission antennas. Also, it is possible to utilize the number of antennas of interference cells that is included in an existing signaling. For example, the number of CSI-RS/CRS ports (the number of antennas) of the interference cell included in RRC for CoMP of release 11 can be used. Also, the number of CRS ports (the number of antennas) of interference cell included in RRC signaling for FeICIC of release 11 can be used. When the user apparatus obtains the information of the number of the transmission antennas, the user apparatus calculates reception quality by using all PMIs corresponding to the whole number of transmission antennas.

A concrete example is described with reference to FIG. 10. FIG. 10 is an example in which the user apparatus has neighbor cell information for two cells (interference cell #1 and interference cell #2), and the user apparatus is notified that the number of the transmission antennas is 2 for each of the interference cells.

In this case, in either case of the interference cell #1 and the interference cell #2, the number of PMIs is 7 in total (4 for RI=1, 3 for RI-2). Therefore, as shown in FIG. 10, in a case where there is interference (user assignment is present), patterns are divided to 7 patterns based on applied PMI (precoding information). Therefore, the number of patters becomes 7×7+7+1=57 in total. The user apparatus calculates a reception quality for each of the 57 patterns. For example, for the case of the uppermost pattern in FIG. 10 (interference cell #1 =interference present and PMI #1, interference cell #2 =interference present and PMI #1), the user apparatus calculates a reception quality after interference reduction by assuming that the transmission weight of the interference signal of the interference cell #1 is PMI#1, and the transmission weight of the interference signal of the interference cell #2 is PMI#1.

Then, the user apparatus obtains, as an estimation result, presence or absence of interference (presence or absence of user assignment) of each interference cell corresponding to the pattern of the largest reception quality, and PMI and RI when interference is present. The PMI/RI information obtained here can be used for interference reduction processing. Accordingly, by considering PMI/RI, estimation accuracy can be improved.

<Calculation Method Example of Reception Quality after Interference Reduction>

Next, an example of calculation method of a reception quality after interference reduction (reception SINR) is described. The method described here is merely an example.

Figure 11:
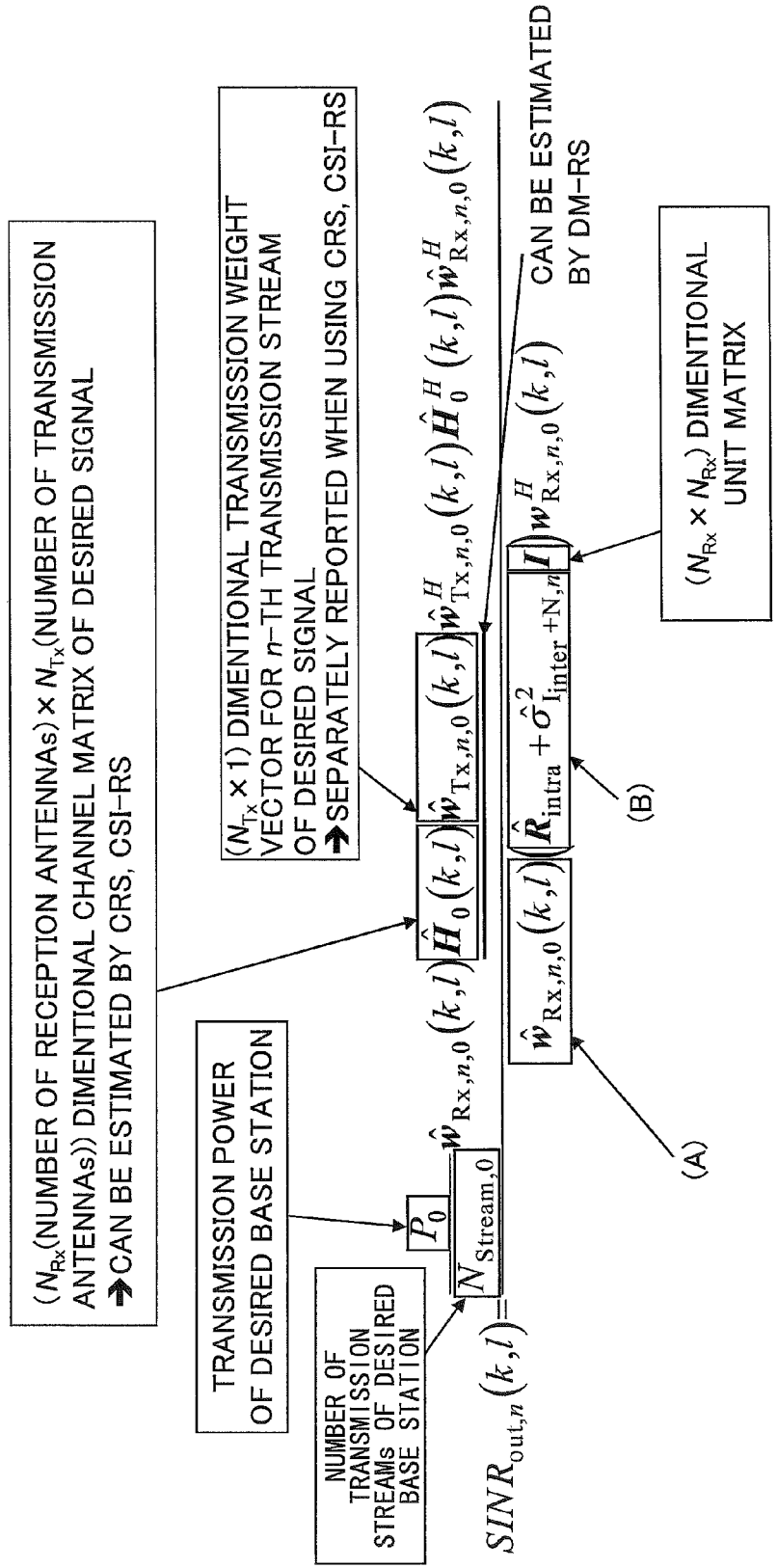
FIG. 11 is a diagram showing a calculation method example of reception quality after interference rejection.

The reception SINR after interference rejection can be calculated by an equation shown in FIG. 11. By the equation shown in FIG. 11, the reception SINR after interference rejection corresponding to an n-th transmission stream, a k-th subcarrier, and an l-th OFDM symbol is calculated. Meaning of main parts in the question is as shown in the figure.

Figure 12:
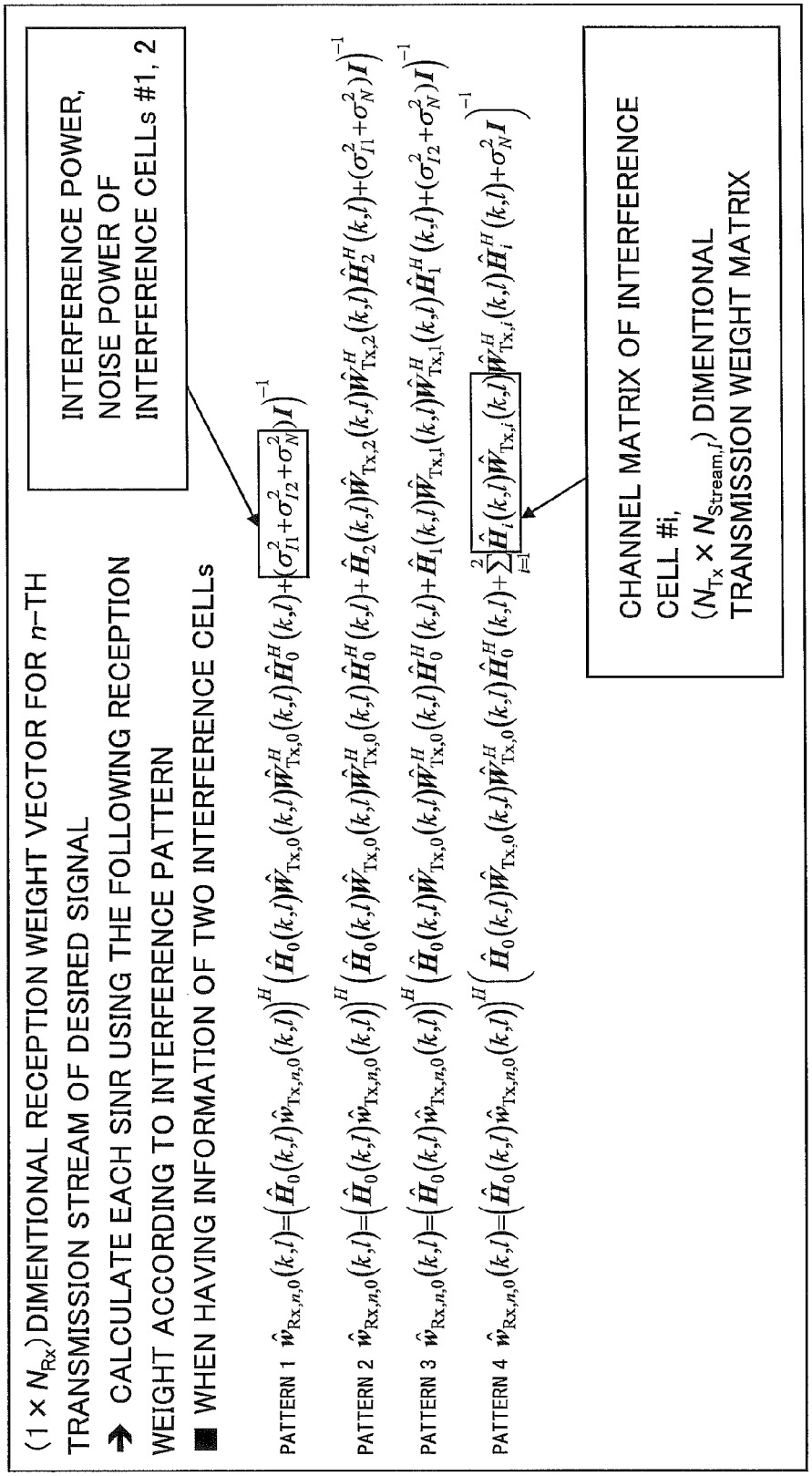
FIG. 12 is a diagram showing a calculation method example of reception quality after interference rejection.

The part shown as (A) of FIG. 11 is $(1 \times N_{RX})$ dimensional reception weight vector for the n-th transmission stream of the desired signal. FIG. 12 shows a calculation example of the reception weight vector in each of the 4 patterns (FIG. 7) shown in the example 1-1. As shown in FIG. 12, each SINR can be calculated by using a reception weight corresponding to the interference pattern.

Figure 13:
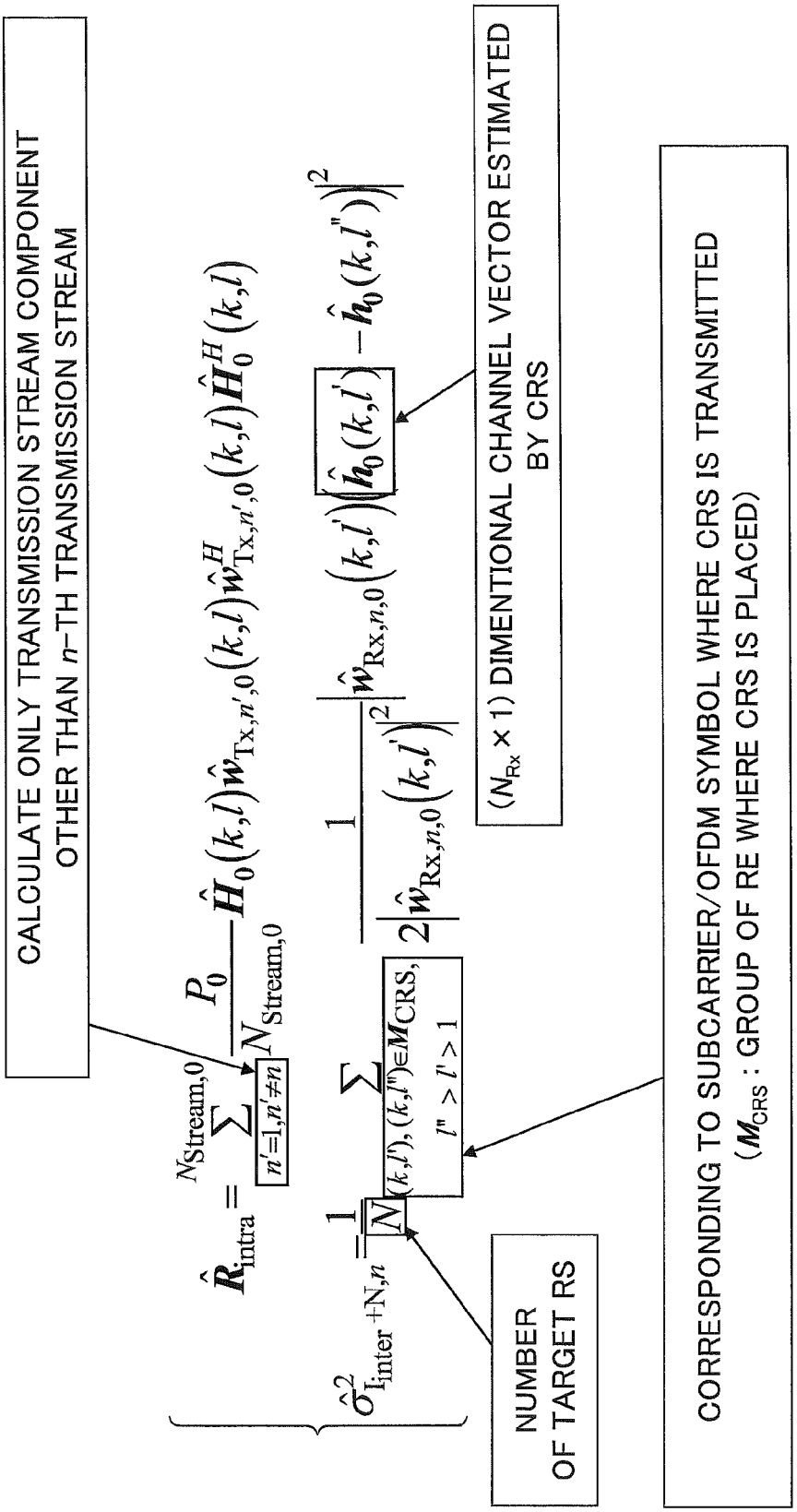
FIG. 13 is a diagram showing a calculation method example of reception quality after interference rejection.
Figure 14:
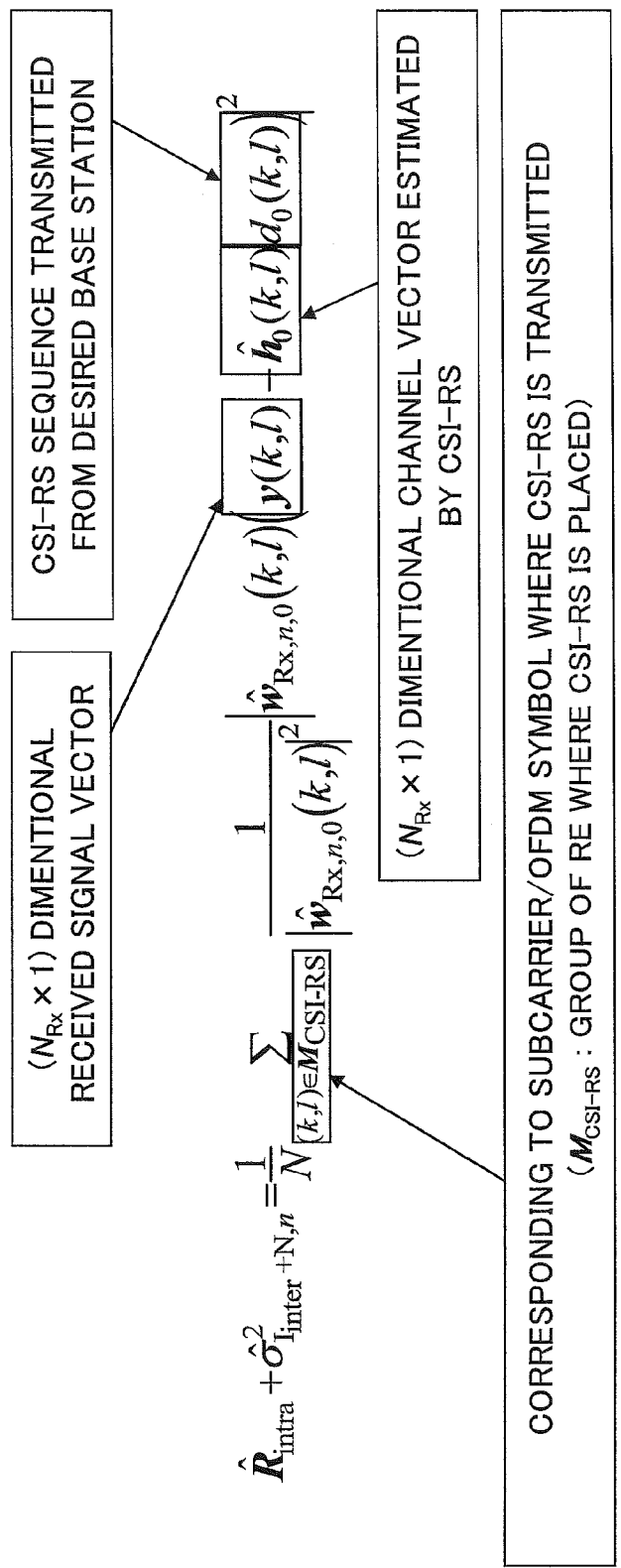
FIG. 14 is a diagram showing a calculation method example of reception quality after interference rejection.
Figure 15:
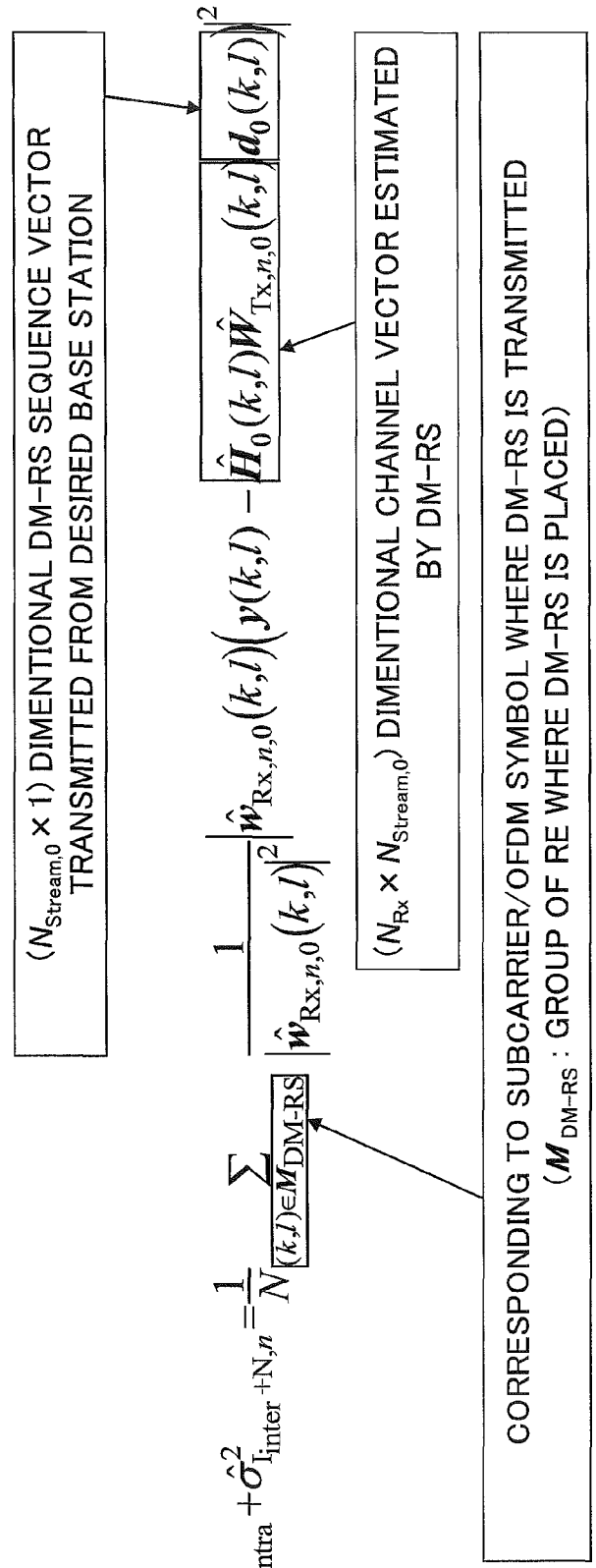
FIG. 15 is a diagram showing a calculation method example of reception quality after interference rejection.

FIGS. 13-15 show a calculation example of the part indicated by (B) in FIG. 11. FIG. 13 shows an example in a case where estimation is performed using CRS, FIG. 14 shows an example in a case where estimation is performed using CSI-RS, and FIG. 15 shows an example in a case where estimation is performed using DM-RS.

An interference-canceled reception SINR can be calculated by an equation shown in FIG. 16. By the equation shown in FIG. 16, the reception SINR after interference cancelling corresponding to the n-th transmission stream, the k-th subcarrier and the l-th OFDM symbol is calculated. Meaning of the main parts in the equation is as shown in the figure.

The part indicated by (C) of FIG. 16 is interference power, and FIG. 17 shows a calculation example of the interference power in each of the 4 patterns (FIG. 7) shown in the example 1-1. As shown in FIG. 17, interference pattern according to each interference pattern is calculated.

<Apparatus Configuration Example 1-1>

Figure 18:
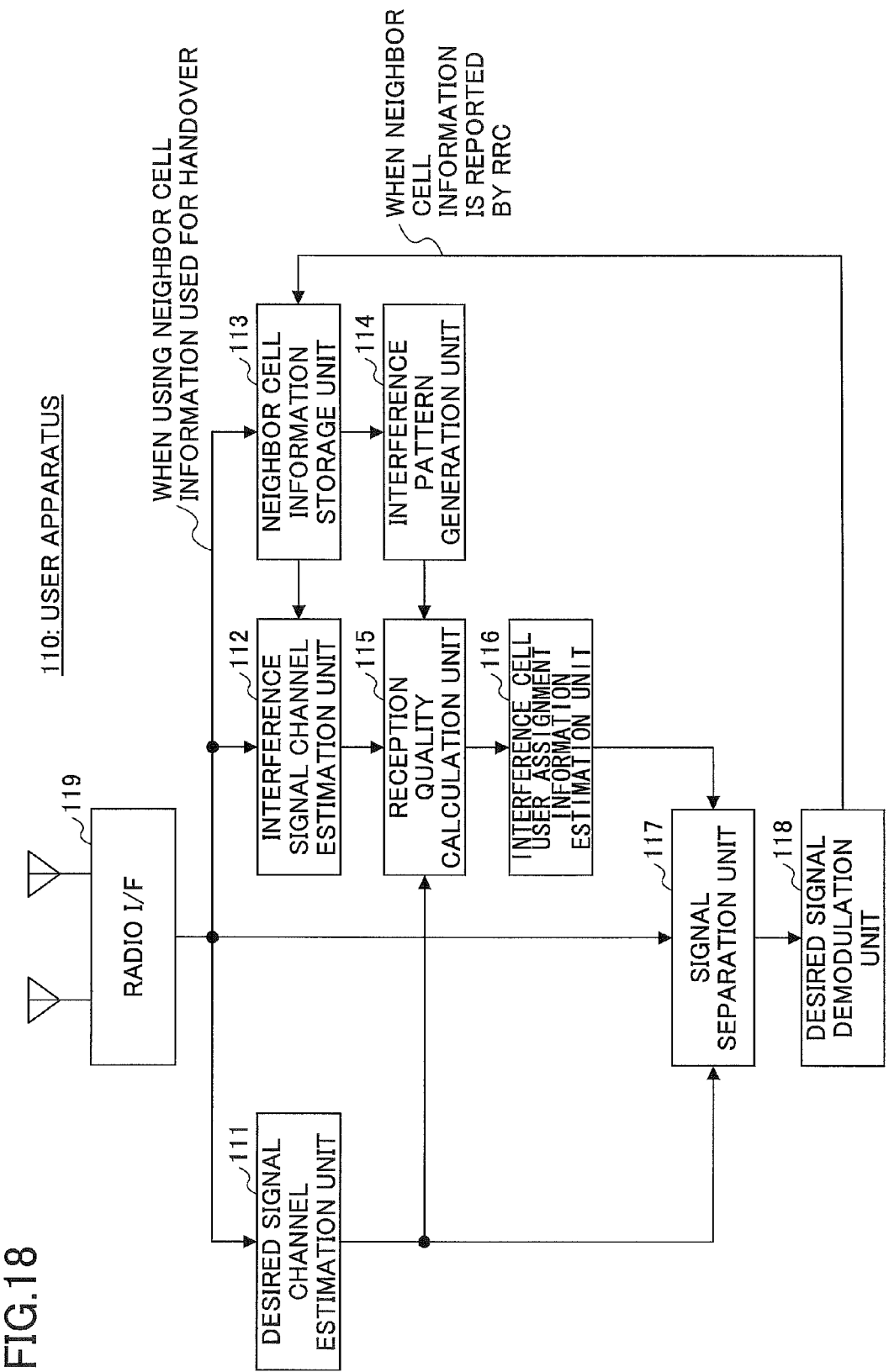
FIG. 18 is a functional block diagram of a user apparatus 110 in the first embodiment.

FIG. 18 shows a functional block diagram of the user apparatus 110 of the present embodiment. The configuration shown in FIG. 18 is a configuration corresponding to the examples 1-1 and 1-2 where PMI/RI is not considered.

As shown in FIG. 18, the user apparatus 110 includes a desired signal channel estimation unit 111, an interference signal channel estimation unit 112, a neighbor cell information storage unit 113, an interference pattern generation unit 114, a reception quality calculation unit 115, an interference cell user assignment information estimation unit 116, a signal separation unit 117, a desired signal demodulation unit 118, and a radio I/F 119.

The desired signal channel estimation unit 111 performs channel estimation for a desired cell. The interference signal channel estimation unit 112 performs channel estimation for an interference cell. The neighbor cell information storage unit 113 holds neighbor cell information obtained for handover, or holds neighbor cell information reported by RRC. The neighbor cell information is used for interference signal channel estimation and interference pattern generation.

The interference pattern generation unit 114 generates a table collecting interference patterns. In the case of the example 1-2, the interference pattern generation unit 114 generates a table restricting the number of interference patterns. The reception quality calculation unit 115 calculates a reception quality after interference reduction for each interference pattern of each RB. The interference cell user assignment information estimation unit 116 estimates user assignment information in the interference cell for each RB based on the method described in the before-mentioned example 1-1 and the like.

The signal separation unit 117 performs signal separation by using the all channel estimation results and user assignment information of interference cells. A concrete signal separation method is IRC, SIC, or the like, for example. The desired signal demodulation unit 118 demodulates a desired signal (including a control signal reported by RRC).

<Operation Example 1-1 of the Apparatus>

Figure 19:
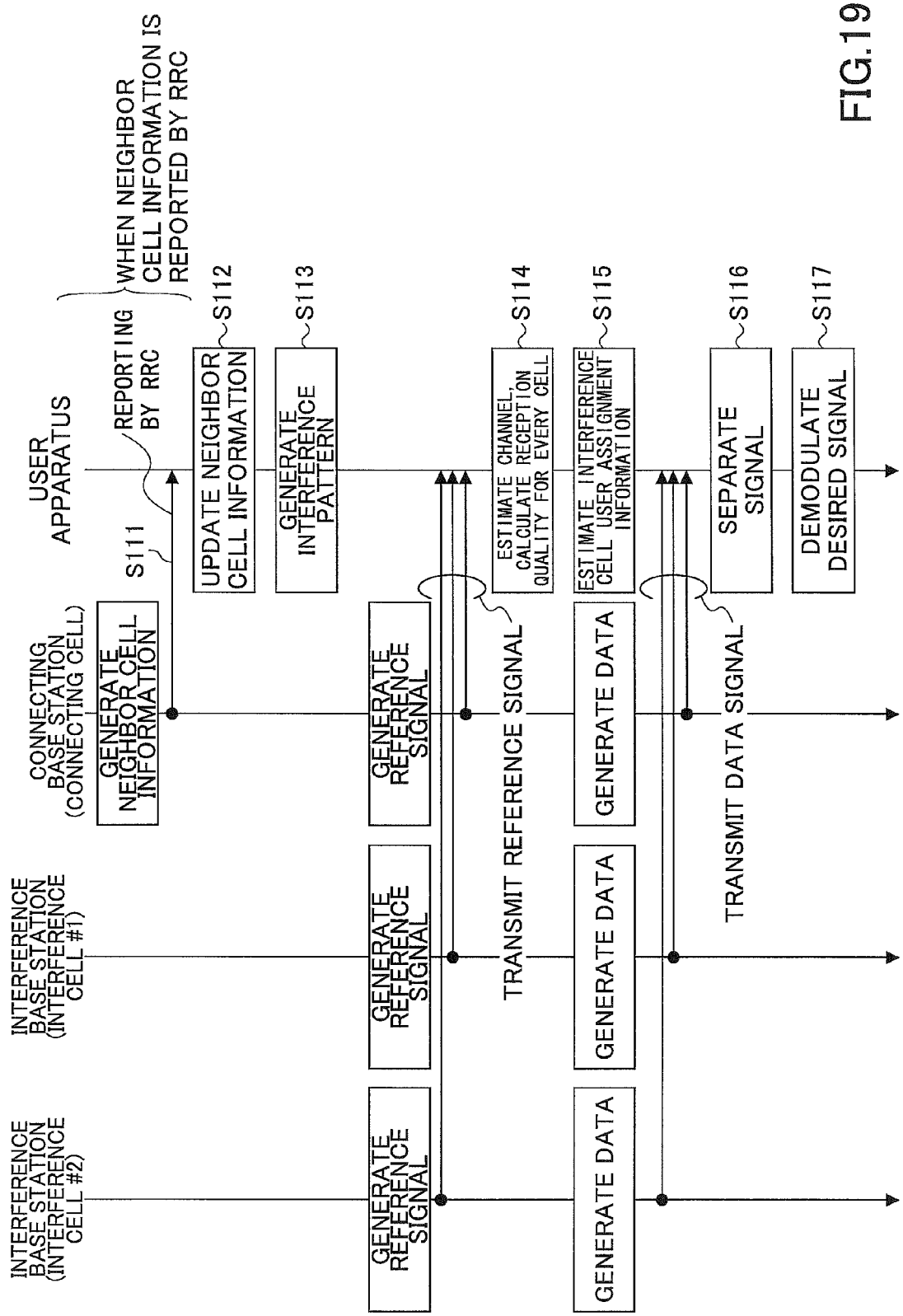
FIG. 19 is a sequence diagram showing operation on the user apparatus 110 in the first embodiment.

Next, an operation example of the user apparatus 110 having the configuration shown in FIG. 18 is described with reference to FIG. 19. FIG. 19 also shows a connecting base station, an interference base station (corresponding to the interference cell #1 ), and an interference base station (corresponding to the interference cell #2 ) in order to make the transmission source of the signal received by the user apparatus 110 easy to understand. The same is true on figures of other operation examples.

The user apparatus 110 receives neighbor cell information from a connecting base station by RRC signaling, for example (step 111), and updates neighbor cell information in the neighbor cell information storage unit 113 (step 112). The interference pattern generation unit 114 generates interference patterns using the neighbor cell information (step 113). Also, the desired signal channel estimation unit 111 performs channel estimation of the connecting cell, and the interference signal channel estimation unit 112 performs channel estimation of each interference cell, and the reception quality calculation unit 115 calculates a reception quality of each pattern by using the interference pattern and each channel estimation value and the like (step 114). Also, the interference cell user assignment information estimation unit 116 estimates user assignment information of interference cell based on the reception quality of each pattern calculated by the reception quality calculation unit 115, the signal separation unit 117 performs signal separation by using the interference cell user assignment information and the like (step 116), and the desired signal demodulation unit 118 performs demodulation of the desired signal (step 117).

<Apparatus Configuration Example 1-2>

Figure 20:
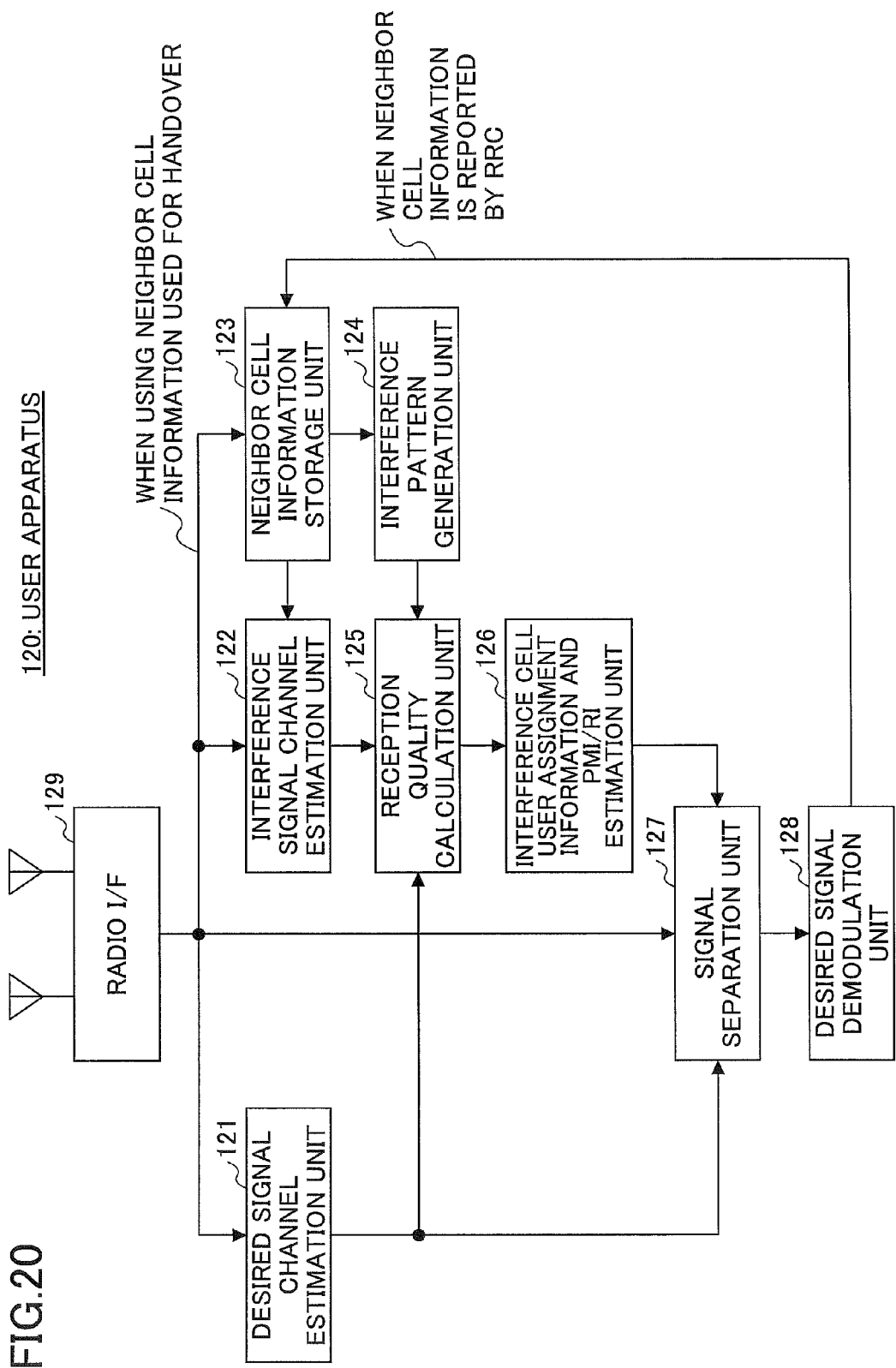
FIG. 20 is a functional block diagram of a user apparatus 120 in the first embodiment.

FIG. 20 shows a functional block diagram of the user apparatus 120 of the present embodiment. The configuration shown in FIG. 20 is a configuration corresponding to the example 1-3 where PMI/RI is considered.

As shown in FIG. 20, the user apparatus 120 includes a desired signal channel estimation unit 121, an interference signal channel estimation unit 122, a neighbor cell information storage unit 123, an interference pattern generation unit 124, a reception quality calculation unit 125, an interference cell user assignment information and PMI/RI estimation unit 126, a signal separation unit 127, a desired signal demodulation unit 128, and a radio I/F 129.

The desired signal channel estimation unit 121 performs channel estimation for a desired cell. The interference signal channel estimation unit 122 performs channel estimation for an interference cell. The neighbor cell information storage unit 123 holds neighbor cell information obtained for handover, or holds neighbor cell information reported by RRC. The neighbor cell information is used for interference signal channel estimation and interference pattern generation.

The interference pattern generation unit 124 generates a table collecting interference patterns. In this example, the interference pattern generation unit 124 generates a table of patterns considering possible PMI/RI based on the number of transmission antennas of the interference base station, for example (example: patterns shown in FIG. 10). The reception quality calculation unit 125 calculates a reception quality after interference reduction for each interference pattern of each RB. The interference cell user assignment information and PMI/RI estimation unit 126 estimates user assignment information and PMI/RI in the interference cell for each RB based on the method described before-mentioned example 1-3.

The signal separation unit 127 performs signal separation by using the all channel estimation results, user assignment information of interference cells and PMI/RI information of interference cells. A concrete signal separation method is IRC, SIC, or the like, for example. The desired signal demodulation unit 128 demodulates a desired signal (including a control signal reported by RRC).

<Operation Example 1-2 of the Apparatus>

Figure 21:
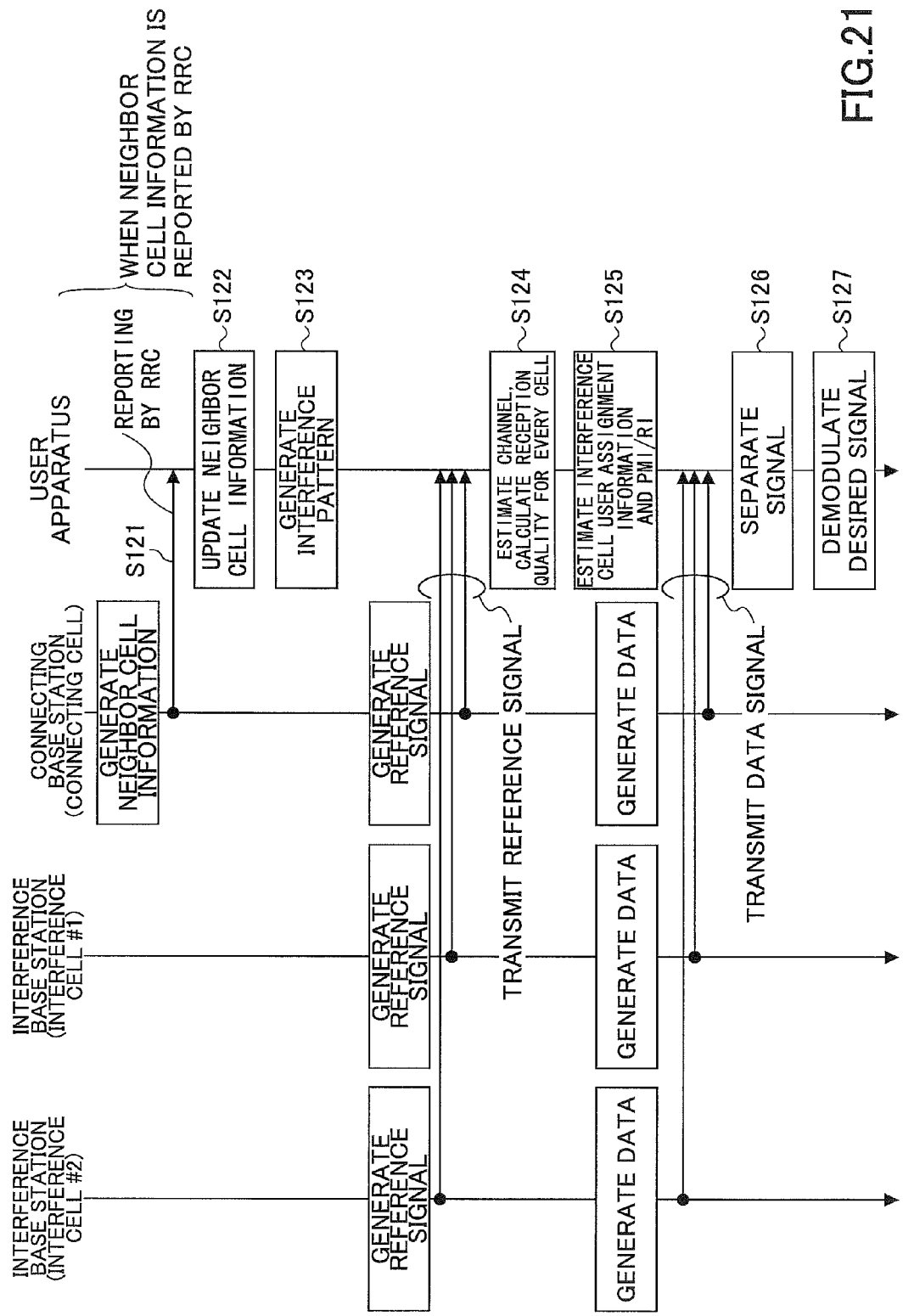
FIG. 21 is a sequence diagram showing operation on the user apparatus 120 in the first embodiment.

Next, an operation example of the user apparatus 120 having the configuration shown in FIG. 20 is described with reference to FIG. 21.

The user apparatus 120 receives neighbor cell information from a connecting base station by RRC signaling, for example (step 121), and updates neighbor cell information in the neighbor cell information storage unit 123 (step 122). The interference pattern generation unit 124 generates interference patterns in which PMI/RI is considered using the neighbor cell information (step 123). Also, the desired signal channel estimation unit 121 performs channel estimation of the connecting cell, and the interference signal channel estimation unit 122 performs channel estimation of each interference cell, and the reception quality calculation unit 125 calculates reception quality of each pattern by using interference pattern and each channel estimation value and the like (step 124). Also, the interference cell user assignment information and PMI/RI estimation unit 126 estimates user assignment information and PMI/RI of the interference cell (step 125), the signal separation unit 127 performs signal separation by using the interference cell user assignment information (step 126), and the desired signal demodulation unit 128 performs demodulation of the desired signal (step 127).

(Second Embodiment)

Next, a second embodiment of the present invention is described.

Example 2-1

Estimate User Assignment by Measuring and Comparing Powers on Interference Signals>

First, a basic example process performed by the user apparatus in the second embodiment is described. In the present embodiment, first, the user apparatus measures interference noise power of each RB before interference reduction. That is, the user apparatus measures interference power+noise power for each RB of all interference cells. In the interference noise power measurement, for example, the measured values may be averaged within RB, or, a value of 1 RE (resource element) may be utilized as a representative value.

The technique for estimating the interference noise power from a reference signal in itself is an existing technique, and for example, the following calculation can estimate interference noise power $\sigma^2$, before interference rejection/canceling, corresponding to an n-th transmission stream, a k-th subcarrier, and an l-th OFDM symbol. Symbols used in the following equations are the same as those shown in FIGS. 11-17.

The case for estimating by CRS is as follows.

$$\sigma^2 = \frac{1}{N} \sum_{\substack{(k,l'),(k,l'') \in M_{CRS}, \\ l'' > l' \geq 1}} \frac{1}{2} |\hat{h}_0(k,l') - \hat{h}_0(k,l'')|^2$$

The case for estimating by CSI-RS is as follows.

$$\sigma^2 = \frac{1}{N} \sum_{(k,l) \in M_{CSI-RS}} |y(k,l) - \hat{h}_0(k,l)d_0(k,l)|^2$$

The case for estimating by DM-RS is as follows.

$$\sigma^2 = \frac{1}{N} \sum_{(k,l) \in M_{DM-RS}} |y(k,l) - \hat{H}_0(k,l)\hat{W}_{Tx,n,0}(k,l)d_0(k,l)|^2$$

Next, the user apparatus performs channel estimation of each interference cell by using CRS, CSI-RS, DM-RS, or a combination of a plurality of ones of these, so as to estimate interference power of each RB of each interference cell. Then, the user apparatus compares the size of the whole interference noise power with the size of the interference power of each interference cell so as to estimate user assignment information in interference cells based on the magnitude relation. A concrete example of user assignment information estimation is described with reference to FIGS. 22-25.

Each of FIGS. 22-25 is an example in a case where the user apparatus has neighbor cell information for two cells (interference cell #1 and interference cell #2). In each example, basically, the user apparatus compares the whole interference noise power with a value obtained by adding interference power of the interference cell #1 and interference power of the interference cell #2, and compares the interference noise power with each of the interference power of the interference cell #1 and the interference power of the interference cell #2.

Figure 22:
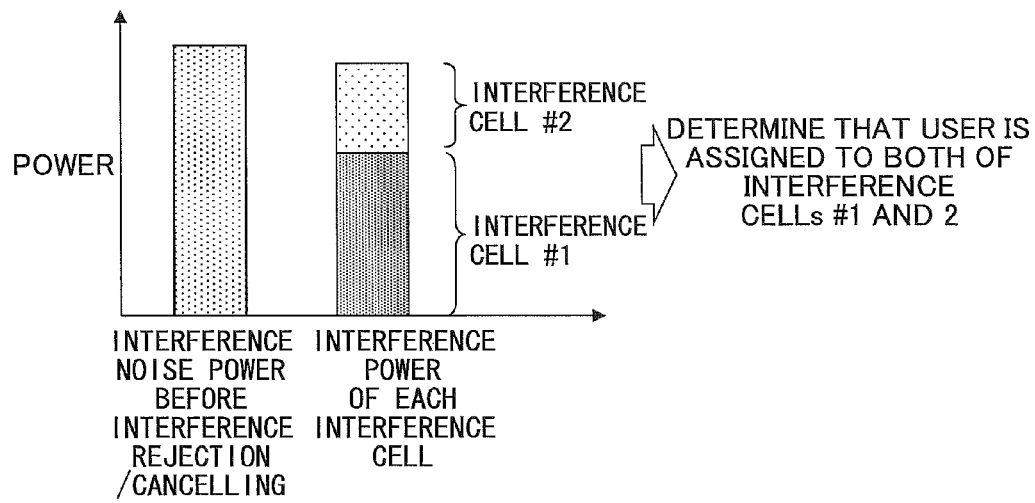
FIG. 22 is a diagram showing an example 1 in which estimation is performed based on a size of interference power.

The example of FIG. 22 shows a case in which the whole interference noise power is greater than the value obtained by adding interference power of the interference cell #1 and interference power of the interference cell #2. In this case, it can be assumed that, since users are assigned to both of the interference cell #1 and the interference cell #2, the value obtained by adding them is included in the whole interference noise power. Therefore, in this case, the user apparatus determines that both of the interference cell #1 and the interference cell #2 are assigned a user.

Figure 23:
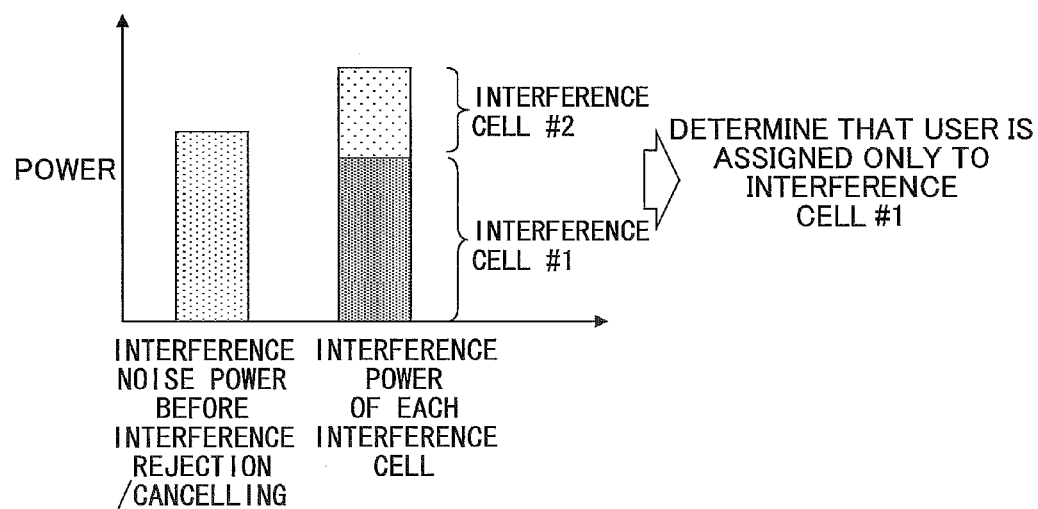
FIG. 23 is a diagram showing an example 2 in which estimation is performed based on a size of interference power.

The example of FIG. 23 shows a case in which the sum of the interference power of the interference cell #1 and the interference power of the interference cell #2 is greater than the whole interference noise power, and, each of the interference power of the interference cell #1 and the interference power of the interference cell #2 is smaller than the whole interference noise power. In this case, it can be estimated that a user is assigned to only one of the interference cell #1 and the interference cell #2. Since interference reduction effect becomes higher by reducing larger interference power for the user apparatus, the user apparatus determines that only the interference cell 1 which has larger interference power between the interference cell #1 and the interference cell #2 is assigned a user.

Figure 24:
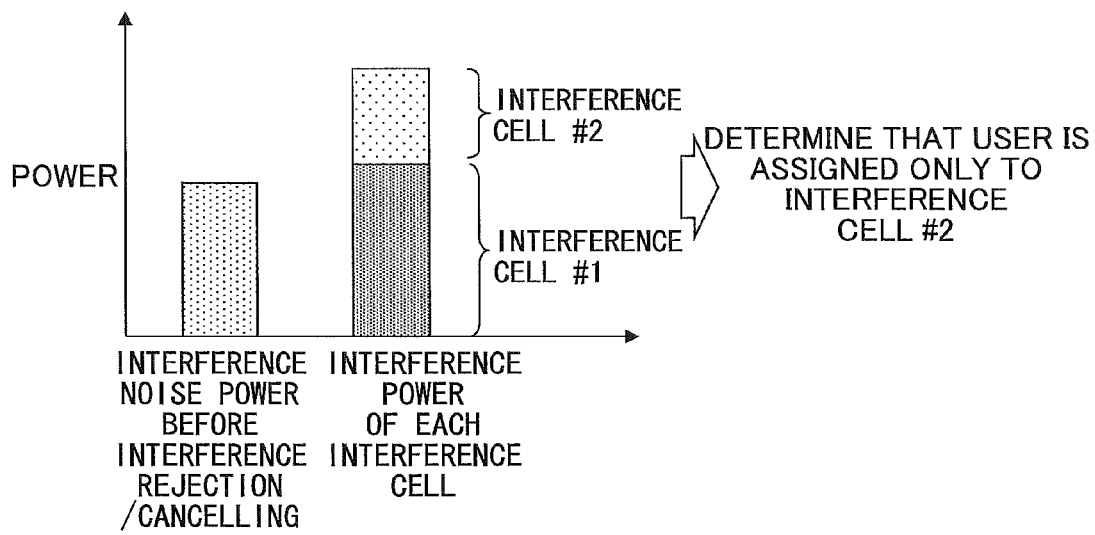
FIG. 24 is a diagram showing an example 3 in which estimation is performed based on a size of interference power.

The example of FIG. 24 shows a case in which the sum of the interference power of the interference cell #1 and the interference power of the interference cell #2 is greater than the whole interference noise power, the interference power of the interference cell #1 is greater than the whole interference noise power, and the interference power of the interference cell #1 is smaller than the whole interference noise power. If a user was assigned to the interference cell #1, the whole interference noise power would become larger than the interference power of the interference cell #1. Thus, in the example of FIG. 24, the user apparatus determines that the interference cell #1 is not assigned a user, and a user is assigned only to the interference cell #2.

Figure 25:
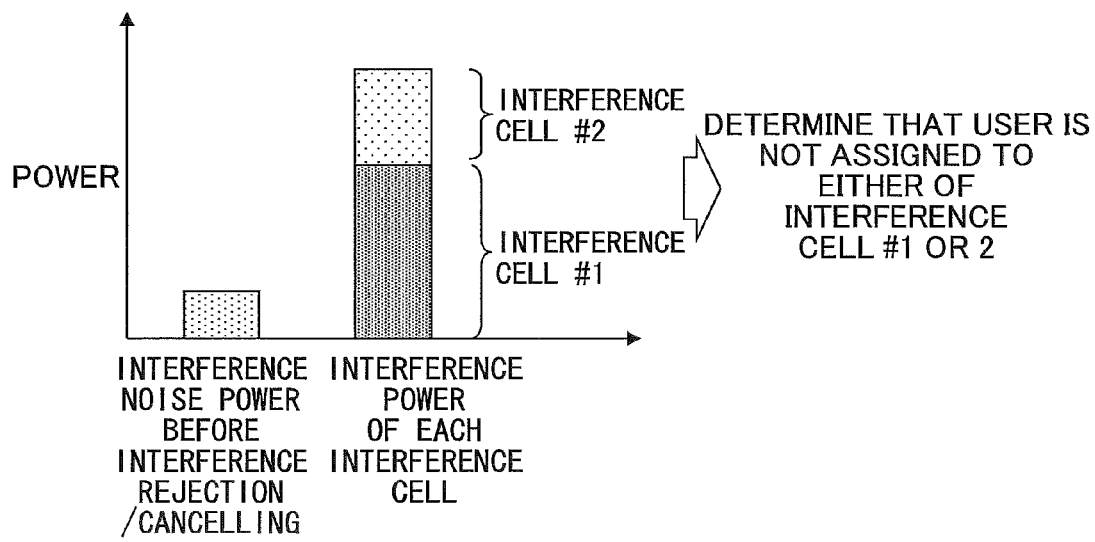
FIG. 25 is a diagram showing an example 4 in which estimation is performed based on a size of interference power.

FIG. 25 shows a case where each of the interference power of the interference cell #1 and the interference power of the interference cell #2 is greater than the whole interference noise power. In this case, the user apparatus determines that none of the interference cell #1 and the interference cell #2 is assigned a user.

EXAMPLE 2-2

Estimate User Assignment by Estimating and Calculating Covariance Matrix for Interference Signal In the example 2-2, the user apparatus estimates a covariance matrix before interference reduction for each RB. That is, the user apparatus calculates a covariance matrix R for all interference cells by calculating the following equations 1 and 2 (refer to non-patent documents 1 and 2).

$$R = \frac{1}{N_{sp}} \sum_{k,l \in RS} \tilde{r}(k,l)\tilde{r}(k,l)^H \qquad \text{(Equation 1)}$$

$$\tilde{r}(k,l) = r(k,l) - H_1(k,l)d_1(k,l) \qquad \text{(Equation 2)}$$

Meaning of each parameter of the equations is as follows.
k: SUBCARRIER INDEX
l: OFDM SYMBOL INDEX
$H_1$: CHANNEL MATRIX OF CONNECTING CELL
r: RECEIVED SIGNAL VECTOR
$d_1$: RS SIGNAL VECTOR OF CONNECTING CELL
$N_{sp}$: AVERAGED SAMPLE NUMBER
H: HERMITE TRANSPOSE As shown in the equation 2, the vector of interference signal + noise signal is obtained by subtracting, from the received signal vector, a value (desired signal of the user apparatus) obtained by multiplying the channel matrix of the connecting cell estimated by the reference signal by the reference signal vector. By performing calculation shown in the equation 1 from the information, the covariance matrix R of the whole interference cells is calculated.

Further, the user apparatus performs channel estimation of each interference cell, so as to estimate a covariance matrix of each interference cell for each RB from the channel estimation result. For example, the user apparatus calculates the following equation to calculate the covariance matrix $R_i$ of each interference cell #i. In the following equation, $H_i$ is a channel matrix of an interference cell #i, which can be obtained by the reference signal.

$$R_i = \frac{1}{N_{sp}} \sum_{k,l \in RS} H_i(k,l)H_i(k,l)^H$$

In the present embodiment 2-2, the user apparatus estimates user assignment information in an interference cell based on comparison between the two covariance matrices. The covariance matrix R includes interference components and noise components for all interference cells. For example, when there is only one interference cell which is assigned a user (example: only interference cell #1), the covariance matrix $R_1$ of the interference cell #1 and R become almost the same value. From such a viewpoint, two covariance matrices are compared so that user assignment information in the interference cell is estimated based on proximity of these. More particularly, in this example, a combination of the smallest matrix norm is selected. This example is described as follows. In this example, the user apparatus has neighbor information of two cells (interference cell #1, interference cell #2).

The user apparatus calculates the matrix norms for 4 patters, as follows, which are the whole patterns (similar to the patters shown in FIG. 7) corresponding to user assignment present/absent for each cell.

$$f(1,1) = \|R - (R_1 + R_2)\|^2, f(0,1) = \|R - R_2\|^2$$

$$f(1,0) = \|R - R_1\|^2, f(0,0) = \|R\|^2$$

In the function f(x,y), x and y indicate presence or absence of user assignment, and x=1 indicates a case where there is user assignment for the interference cell #1 , x=0 indicates a case where there is not user assignment for the interference cell #1 , y=1 indicates a case where there is user assignment for the interference cell #2, y=0 indicates a case where there is not user assignment for the interference cell #2. Also, f(x,y) is a matrix norm of a matrix obtained by subtracting, from the covariance matrix R of the whole interference cells, a sum of covariance matrix $R_i$ of interference cells where user assignment is present. For example, f(1,1) is a matrix norm of a matrix obtained by subtracting, from the covariance matrix R, the covariance matrix $R_1$ of the interference cell #1 and the covariance matrix $R_2$ of the interference cell #2.

As mentioned above, the covariance matrix R of the whole interference cells is supposed to become a value which is the closest to the sum of the covariance matrix $R_i$ of interference cells where a user is actually assigned. Thus, the user apparatus determines assignment of the pattern corresponding to the smallest matrix norm in the matrix norms of the whole patterns to be estimated information. For example, assuming that f(0,1) is the smallest in the 4 patterns, it is assumed that user assignment is present only in the interference cell #2.

EXAMPLE 2-3

Restriction of the Number of Interference Cells

In this example, like the example 1-2, the user apparatus restricts the number of interference cells for which interference power or covariance matrix is calculated. The example 2-3 may be carried out with any other example in the second embodiment.

For restricting the number of interference patterns, for example, cells are limited to top several cells of large interference power based on neighbor cell power which the user apparatus has for handover. The number of the top several cells is predetermined. For the limited umber interference cells, interference power or covariance matrix is calculated.

Also, the maximum number of cells may be predetermined so that cells may be limited to the maximum number of cells in a descending order of interference power. Also, an interference power threshold may be predetermined so that cells may be limited to cells having interference power equal to or greater than the interference power threshold. Also, interference cells may be limited by combining these.

Further, the base station reports the number of interference cells to the user apparatus by RRC signaling, for example, so that the user apparatus may generate patterns of interference cells narrowed down to the number of cells. In this case, the cells may be narrowed down arbitrarily or cells of the number of the interference cells may be selected in an descending order of the interference power. Also, for example, cells may be limited to the number of transmission points included in RRC signaling for CoMP defined in release 11 of LTE, for example.

As to an interference cell not included in the interference pattern, it is determined that there is not a large effect of interference from the cell. That is, as to the interference cell that is not included in the interference pattern, the user apparatus may perform the process of interference reduction by assuming that a user is always assigned to the cell or a user is not assigned to the cell at any time. Handling for the interference cell not included in the interference pattern is not limited to this example.

A concrete example of reduction of the number of interference patterns is described as follows. This example is an example in which the number of interference cells indicated by neighbor cell information is two (interference cell #1 and interference cell #2), and the number of the interference cell for generating the interference pattern is limited to one at the maximum. In this case, for example, since interference power of the interference cell #1 is greater than that of the interference cell #2, it is assumed that the user apparatus has selected the interference cell #1 as one interference cell.

Figure 26:
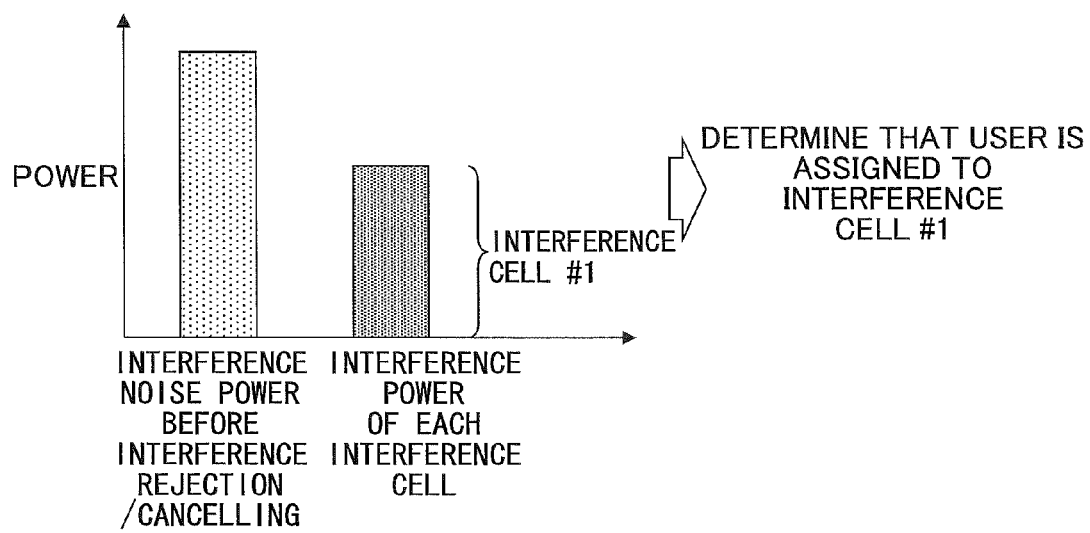
FIG. 26 is a diagram showing an example 1 in which estimation is performed based on a size of interference power when interference cells are restricted.
Figure 27:
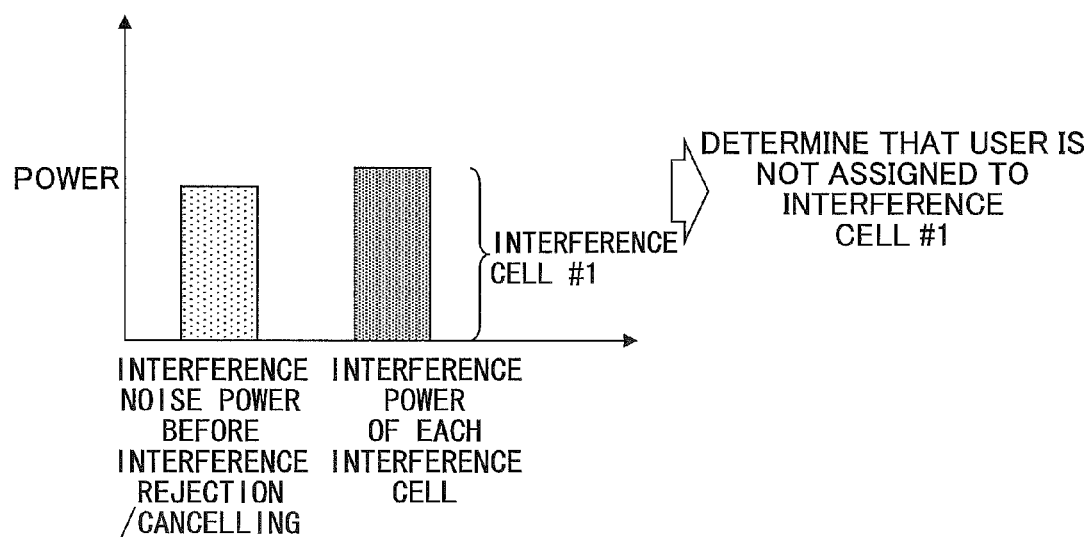
FIG. 27 is a diagram showing an example 2 in which estimation is performed based on a size of interference power when interference cells are restricted.

FIGS. 26 and 27 show examples for performing user assignment estimation by using interference power. As shown in FIG. 26, the user apparatus determines that a user is assigned to the interference cell #1 when the interference noise power is greater than the interference power of the interference cell #1. As shown in FIG. 27, when the interference noise power is smaller than the interference power of the interference cell #1, the user apparatus determines that any user is not assigned to the interference cell #1.

In a case where user assignment estimation is performed by using the covariance matrix, the user apparatus calculates matrix norms for the following two patterns. That is, the matrix norms are calculated by considering only the interference cell #1.

$$f(1)=\|R-R_1\|^2$$

$$f(0)=\|R\|^2$$

Then, as described before, the user apparatus estimates user assignment information based on a pattern that becomes the smallest norm. For example, when f(1) is the smallest, the user apparatus determines that user assignment is present in the interference cell #1.

EXAMPLE 2-4

Estimation in Consideration of PMI/RI

In this example, like the example 1-3, the user apparatus calculates covariance matrices of each interference cell by considering all of possible PMI/RI patterns in the user apparatus so as to estimate user assignment by a method similar to the example 2-2.

However, in a case where all of the PMI/RI patterns are blindly considered, the number of patterns becomes large so that the calculation amount increases. Thus, by focusing on the fact that the number of patterns of PMI is limited based on the number of transmission antennas, the number of patterns may be restricted based on the number of antennas.

For example, the base station transmits the number of transmission antenna of interference cells to the user apparatus semi-statically by downlink RRC, so that the user apparatus calculates reception quality in consideration of the patterns corresponding to the number of the transmission antennas. Also, it is possible to utilize the number of antennas of interference cells that is included in an existing signaling. For example, the number of CSI-RS/CRS ports (the number of antennas) of the interference cell included in RRC for CoMP of release 11 can be used. Also, the number of CRS ports (the number of antennas) of interference cell included in RRC for FeICIC of release 11 can be used. When the user apparatus obtains the information of the number of the transmission antennas, the user apparatus calculates covariance matrix of each interference cell by using all PMIs corresponding to the whole number of transmission antennas.

The covariance matrix $R_i$ of each interference cell considering PMI can be obtained by multiplying the channel matrix of the interference cell by the transmission weight matrix corresponding to PMI.

A concrete example is the same as one described with reference to FIG. 10. That is, as shown in FIG. 10, the user apparatus has neighbor cell information for two cells (interference cell #1 and interference cell #2), and the user apparatus is notified that the number of the transmission antennas is 2 for any of the interference cells. In this case, the number of patterns becomes 57. The user apparatus calculates a matrix norm for each pattern, and determines user assignment and PMI/RI corresponding to the smallest matrix norm to be the estimated value. Accordingly, by considering PMI/RI, estimation accuracy can be improved.

EXAMPLE 2-5

Restrict the Number of Interference Patterns in the First Embodiment

In the example 2-5, the number of interference patterns in the first embodiment is reduced by using the process of the example 2-1.

In the present embodiment, first, the user apparatus measures interference noise power of each RB before interference reduction. That is, the user apparatus measures interference power+noise power of all interference cells. Also, the user apparatus performs channel estimation of each interference cell, so as to estimate interference power of each RB of each interference cell based on the estimation result. The user apparatus restricts the number of interference patterns of the first embodiment based on relationship of the two powers.

Figures 28, 29:
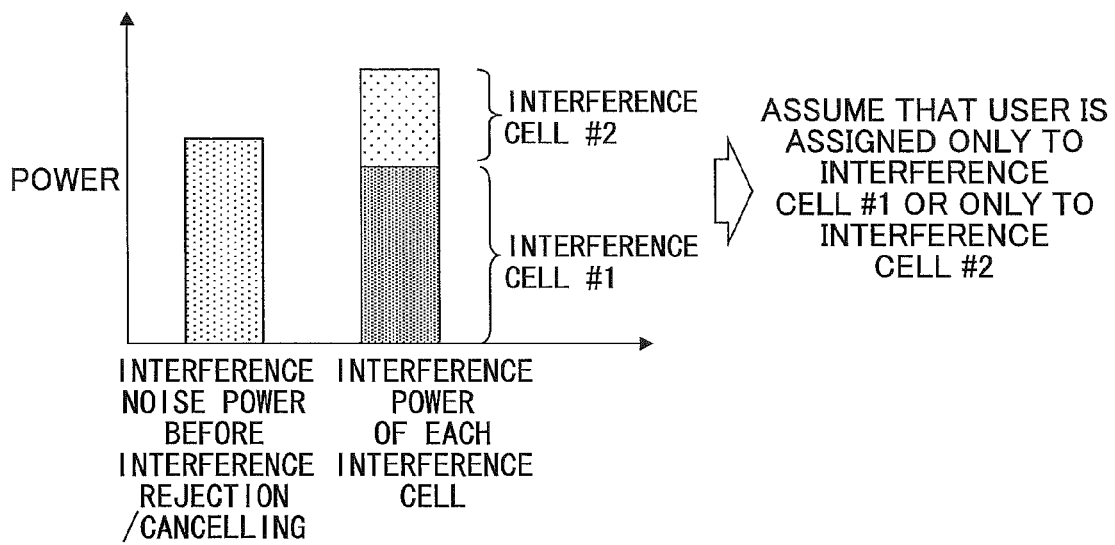
FIG. 28 is a diagram showing an example in which estimation is performed based on a size of interference power.
FIG. 29 is a diagram showing reduction of interference patters in the first embodiment by using an estimation result of FIG. 28.

Concrete examples are described with reference to FIGS. 28 and 29. In a case where the user apparatus has neighbor cell information for the two cells, it is assumed that the user apparatus measures interference noise power and interference power of each interference cell to obtain relationship shown in FIG. 28. This is similar to the relationship shown in FIG. 23, and it can be estimated that only one of the interference cell #1 and the interference cell #2 is assigned a user. However, for example, when the size of the interference power of the interference cell #1 is close to the size of the interference power of the interference cell #2, it is difficult to determine a cell to which the user is assigned between the interference cell #1 and the interference cell #2.

Then, in this example, by utilizing the estimation result that a user is assigned to only one of the interference cell #1 and the interference cell #2, the number of the patters in the first embodiment is reduced. That is, as shown in FIG. 29, in a case where there are 4 patterns in total (like the example 1-1), there is no possibility for the patterns 1 and 4 based on the information that a user is assigned to only one of the interference cell #1 and the interference cell #2. Thus, patterns can be narrowed down to the patterns 2 and 3. Then, the user apparatus performs processing described in the first embodiment for the two patterns. That is, the user apparatus calculates reception quality after interference reduction to determine assignment for the pattern corresponding to the largest reception quality to be an estimation result.

<Apparatus Configuration Example 2-1>

Figure 30:
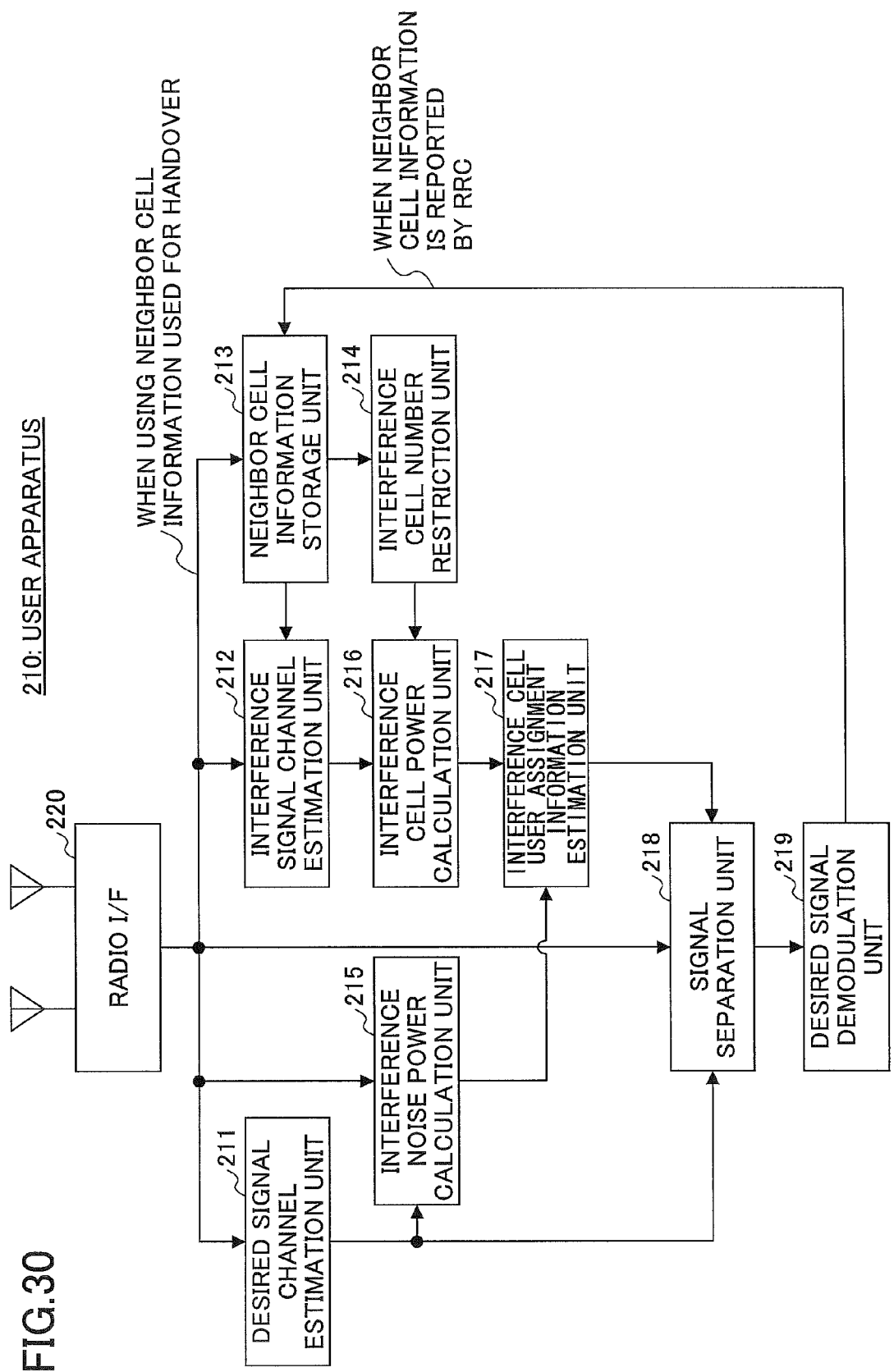
FIG. 30 is a functional block diagram of a user apparatus 210 in the second embodiment.

FIG. 30 shows a functional block diagram of the user apparatus 210 of the present embodiment. The configuration shown in FIG. 30 is a configuration corresponding to the examples 2-1 and 2-3. However, the interference cell number restriction unit 214 may not be provided when the user apparatus 210 is applied to examples other than the example 2-3.

As shown in FIG. 30, the user apparatus 210 includes a desired signal channel estimation unit 211, an interference signal channel estimation unit 212, a neighbor cell information storage unit 213, an interference cell number restriction unit 214 (necessary only for example 2-3), an interference noise power calculation unit 215, an interference cell power calculation unit 216, an interference cell user assignment information estimation unit 217, a signal separation unit 218, a desired signal demodulation unit 219, and a radio I/F 220.

The desired signal channel estimation unit 211 performs channel estimation for a desired cell. The interference signal channel estimation unit 212 performs channel estimation for an interference cell. The neighbor cell information storage unit 213 holds neighbor cell information obtained for handover, or holds neighbor cell information reported by RRC. The neighbor cell information is used for interference signal channel estimation and interference cell number restriction.

The interference cell number restriction unit 214 restricts the number of interference cells based on the neighbor cell power for handover, for example. The interference noise power calculation unit 215 estimates the whole interference noise power based on a channel estimation result of the desired cell and a received signal. The interference cell power calculation unit 216, calculates interference power of each interference cell. The interference cell user assignment information estimation unit 217 estimates user assignment information in the interference cell for each RB based on the method of comparing between the whole interference noise power and interference power of each interference cell described in before-mentioned example 2-1.

The signal separation unit 218 performs signal separation by using all channel estimation results and user assignment information of interference cells. A concrete signal separation method is IRC, SIC, for example. The desired signal demodulation unit 219 demodulates a desired signal (including a control signal reported by RRC).

<Operation Example 2-1 of the Apparatus>

Figure 31:
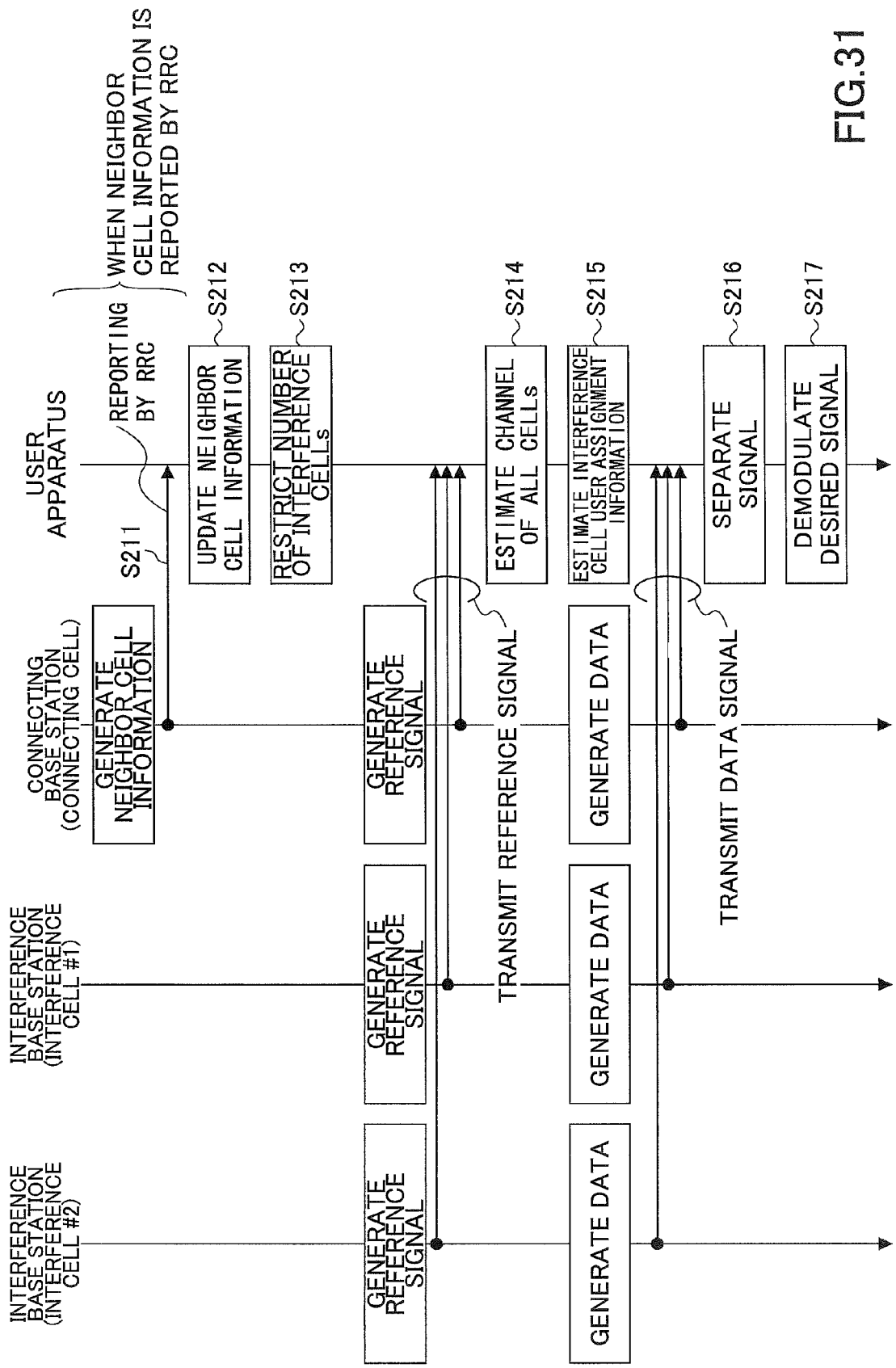
FIG. 31 is a sequence diagram showing operation on the user apparatus 210 in the second embodiment.

Next, an operation example of the user apparatus 210 having the configuration shown in FIG. 30 is described with reference to FIG. 31.

The user apparatus 210 receives neighbor cell information from a connecting base station by RRC signaling, for example (step 211), and updates neighbor cell information in the neighbor cell information storage unit 213 (step 212). In the case of the example 2-3, next, the interference cell number restriction unit 214 restricts the number of interference cells based on neighbor cell power for handover, for example (step 213). The information of the restricted interference cells is reported to the interference cell power calculation unit 216.

Also, the desired signal channel estimation unit 211 performs channel estimation of the connecting cell, and the interference signal channel estimation unit 212 performs channel estimation of each interference cell, and the interference noise power calculation unit 215 estimates the whole interference noise power based on the channel estimation result of the desired cell and the received signal, and the interference cell power calculation unit 216 calculates interference power of each interference cell (step 214). Also, the interference cell user assignment information estimation unit 217 estimates user assignment information of interference cells based on the method described in the example 2-1 and the like (step 215), the signal separation unit 218 performs signal separation by using the interference cell user assignment information and the like (step 216), and the desired signal demodulation unit 219 performs demodulation of the desired signal (step 217).

<Apparatus Configuration Example 2-2>

Figure 32:
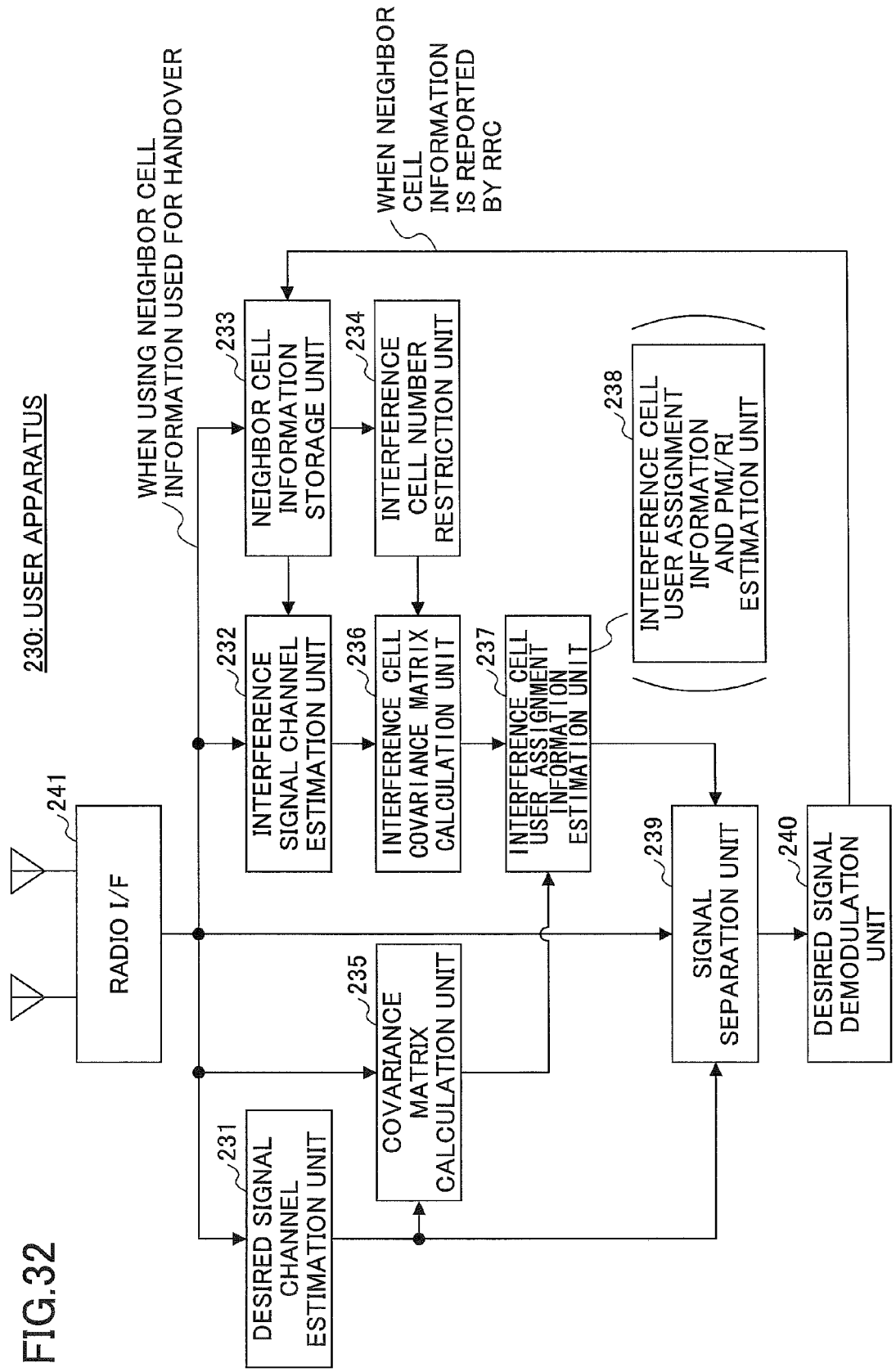
FIG. 32 is a functional block diagram of a user apparatus 230 in the second embodiment.

FIG. 32 shows a functional block diagram of the user apparatus 230 of the present embodiment. The configuration shown in FIG. 32 is a configuration corresponding to the examples 2-2, 2-3 and 2-4. However, for the example 2-4, the interference cell user assignment information estimation unit 237 is replaced with an interference cell user assignment information and PMI/RI estimation unit 238. Also, the interference cell number restriction unit 234 may not be provided when the user apparatus 230 is applied to examples other than the example 2-3.

As shown in FIG. 32, the user apparatus 230 includes a desired signal channel estimation unit 231, an interference signal channel estimation unit 232, a neighbor cell information storage unit 233, an interference cell number restriction unit 234 (necessary only for example 2-3), a covariance matrix calculation unit 235, an interference cell covariance matrix calculation unit 236, an interference cell user assignment information estimation unit 237 (an interference cell user assignment information and PMI/RI estimation unit 238 for example 2-4), a signal separation unit 239, a desired signal demodulation unit 240, and a radio I/F 241.

The desired signal channel estimation unit 231 performs channel estimation for a desired cell. The interference signal channel estimation unit 232 performs channel estimation for an interference cell. The neighbor cell information storage unit 233 holds neighbor cell information obtained for handover, or holds neighbor cell information reported by RRC. The neighbor cell information is used for interference signal channel estimation and interference cell number restriction.

The interference cell number restriction unit 234 restricts the number of interference cells based on the neighbor cell power for handover, for example. The covariance matrix calculation unit 235 estimates the covariance matrix based on the whole interference cell+noise from the channel estimation result of the desired cell and the received signal. The interference cell covariance matrix calculation unit 236 calculates the covariance matrix of each interference cell. The interference cell user assignment information estimation unit 237 estimates user assignment information in interference cells for each RB based on the method described before-mentioned example 2-2.

The signal separation unit 239 performs signal separation by using the all channel estimation results and user assignment information of interference cells. A concrete signal separation method is IRC, SIC, for example. The desired signal demodulation unit 240 demodulates a desired signal (including a control signal reported by RRC).

For considering PMI/RI like the example 2-4, the interference cell covariance matrix calculation unit 236 calculates the covariance matrix of each interference cell for each possible PMI. Also, the interference cell user assignment information and PMI/RI estimation unit 238 estimates, as described in the example 2-4, interference cell user assignment information and PMI/RI based on the matrix norm of all patterns considering PMI.

<Operation Example 2-2 of the Apparatus>

Figure 33:
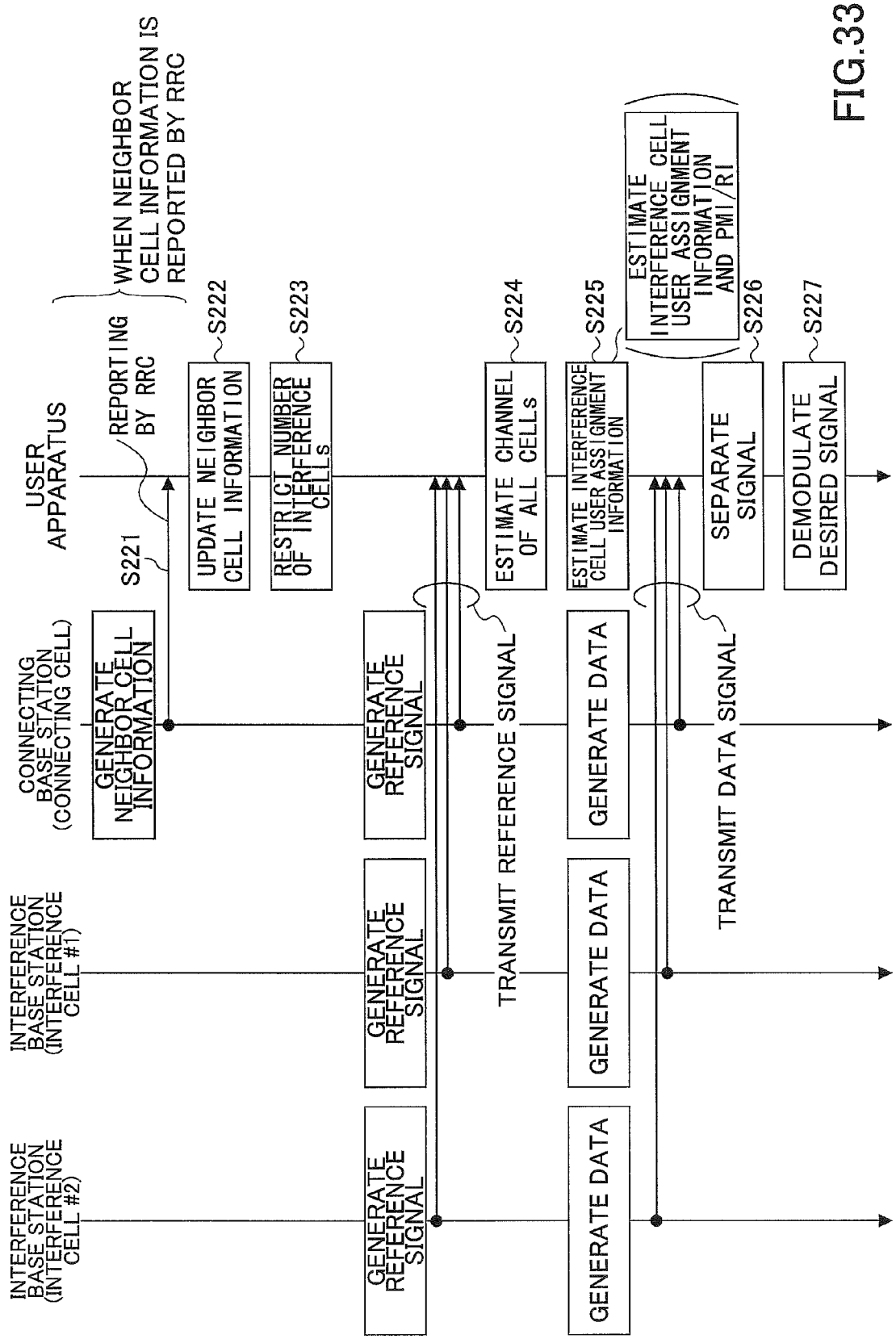
FIG. 33 is a sequence diagram showing operation on the user apparatus 230 in the second embodiment.

Next, an operation example of the user apparatus 230 having the configuration shown in FIG. 32 is described with reference to FIG. 33.

The user apparatus 230 receives neighbor cell information from a connecting base station by RRC signaling, for example (step 221), and updates neighbor cell information in the neighbor cell information storage unit 233 (step 222). In the case of the example 2-3, next, the interference cell number restriction unit 234 restricts the number of interference cells based on neighbor cell power for handover, for example (step 223). The information of the restricted interference cells is reported to the interference cell power calculation unit 236.

Also, the desired signal channel estimation unit 231 performs channel estimation of the connecting cell, and the interference signal channel estimation unit 232 performs channel estimation of each interference cell, and the covariance matrix calculation unit 235 estimates the covariance matrix based on the whole interference cell+noise from the channel estimation result of the desired cell and the received signal, and the interference cell covariance matrix calculation unit 236 calculates the covariance matrix of each interference cell (step 224).

Also, the interference cell user assignment information estimation unit 237 estimates user assignment information of interference cells based on the method described in the example 2-2 and the like (step 225), the signal separation unit 239 performs signal separation by using the interference cell user assignment information and the like (step 226), and the desired signal demodulation unit 240 performs demodulation of the desired signal (step 227). Also, as shown in FIG. 33, for the example 2-4, in step 225, the interference cell user assignment information and PMI/RI estimation unit 238 estimates the interference cell user assignment information and PMI/RI.

<Apparatus Configuration Example 2-3>

Figure 34:
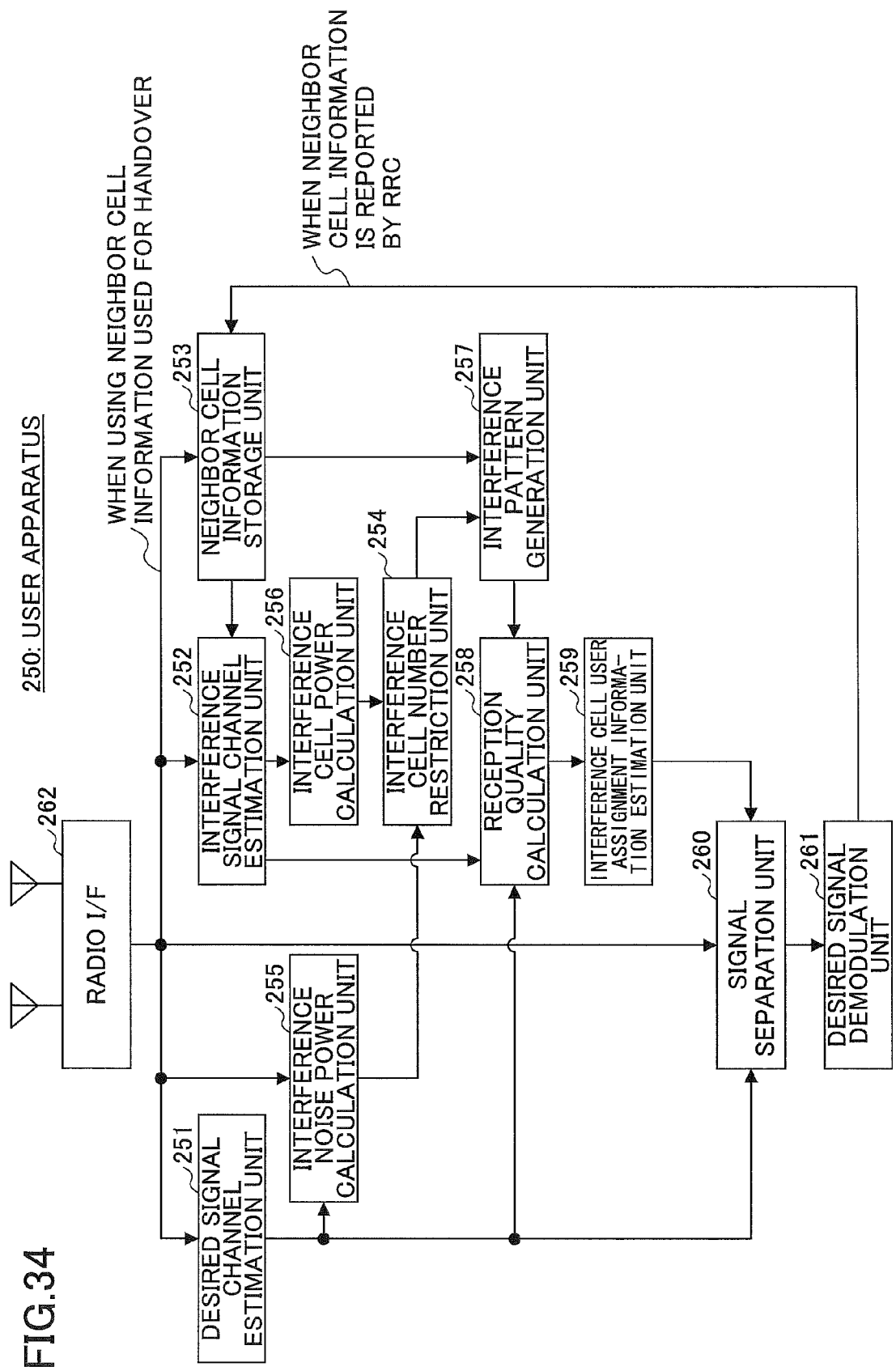
FIG. 34 is a functional block diagram of a user apparatus 250 in the second embodiment.

FIG. 34 shows a functional block diagram of the user apparatus 250 of the present embodiment. The configuration shown in FIG. 34 is a configuration corresponding to the example 2-5.

As shown in FIG. 34, the user apparatus 250 includes a desired signal channel estimation unit 251, an interference signal channel estimation unit 252, a neighbor cell information storage unit 253, an interference cell number restriction unit 254, an interference noise power calculation unit 255, an interference cell power calculation unit 256, an interference pattern generation unit 257, a reception quality calculation unit 258, an interference cell user assignment information estimation unit 259, a signal separation unit 260, a desired signal demodulation unit 261, and a radio I/F 262.

The desired signal channel estimation unit 251 performs channel estimation for a desired cell. The interference signal channel estimation unit 252 performs channel estimation for an interference cell. The neighbor cell information storage unit 253 holds neighbor cell information obtained for handover, or holds neighbor cell information reported by RRC. The neighbor cell information is used for interference signal channel estimation and interference cell number restriction.

The interference noise power calculation unit 255 estimates the whole interference noise power based on a channel estimation result of the desired cell and a received signal. The interference cell power calculation unit 256 calculates interference power of each interference cell. The interference cell number restriction unit 254 restricts the number of interference cells by the method described in the example 2-5 based on the results calculated by the interference noise power calculation unit 255 and the interference cell power calculation unit 256.

The interference pattern generation unit 257 generates the table collecting the patterns restricted by the interference cell number restriction unit 254. The reception quality calculation unit 258 calculates reception quality after interference reduction for each interference pattern for each RB. The interference cell user assignment information estimation unit 259 estimates user assignment information in the interference cells for each RB based on the method described before-mentioned example 1-1 and the like.

The signal separation unit 260 performs signal separation by using the all channel estimation results and user assignment information of interference cells. A concrete signal separation method is IRC, SIC, for example. The desired signal demodulation unit 261 demodulates a desired signal (including a control signal reported by RRC).

<Operation Example 2-3 of the Apparatus>

Figure 35:
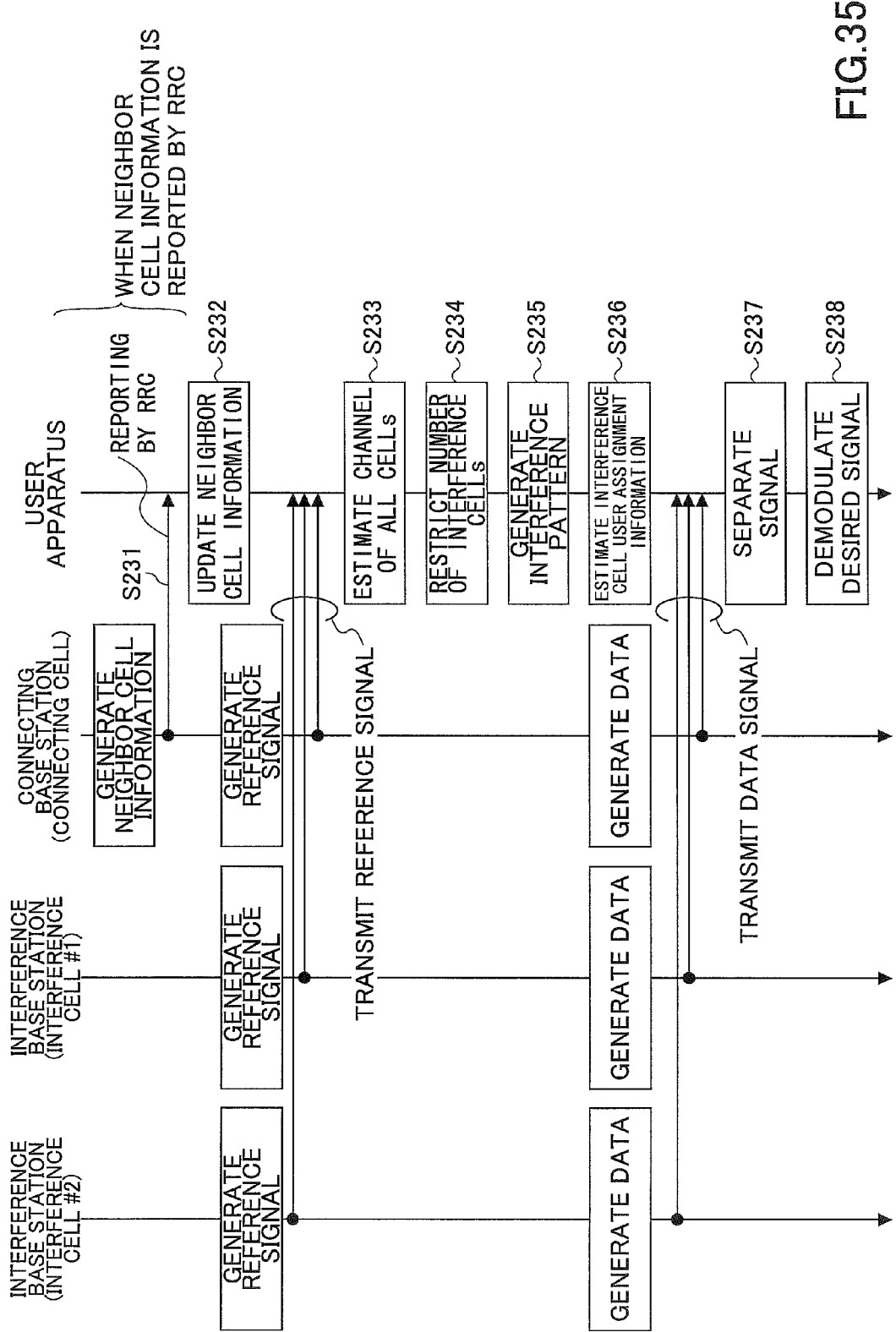
FIG. 35 is a sequence diagram showing operation on the user apparatus 250 in the second embodiment.

Next, an operation example of the user apparatus 250 having the configuration shown in FIG. 34 is described with reference to FIG. 35.

The user apparatus 250 receives neighbor cell information from a connecting base station by RRC signaling, for example (step 231), and updates neighbor cell information in the neighbor cell information storage unit 253 (step 232). Also, the desired signal channel estimation unit 251 performs channel estimation of the connecting cell, and the interference signal channel estimation unit 252 performs channel estimation of each interference cell, and the interference noise power calculation unit 255 estimates the whole interference noise power based on the channel estimation result of the desired cell and the received signal, and the interference cell power calculation unit 256 calculates interference power of each interference cell (step 233). Then, the interference cell number restriction unit 254 restricts the number of interference cells by the method of the example 2-5 (step 234). Based on this restriction, the interference pattern generation unit 257 generates the interference patterns (step 235)

Further, the reception quality calculation unit 258 calculates reception quality of each pattern by using the interference pattern and each channel estimation value and the like, and the interference cell user assignment information estimation unit 259 estimates user assignment information of interference cells based on the reception quality of each pattern calculated by the reception quality calculation unit 258 (step 236), the signal separation unit 237 performs signal separation by using the interference cell user assignment information (step 237), and the desired signal demodulation unit 261 performs demodulation of the desired signal (step 238).

(Third Embodiment)

This embodiment can be applied to any of the first and the second embodiments. In the present embodiment, the base station determines necessity of estimation of user assignment information at the user apparatus, and reports, by signaling of RRC and the like, to the user apparatus, information indicating whether to perform estimation of the user assignment information or not in the user apparatus side. The user apparatus performs estimation of user assignment information so as to perform processes of interference reduction only when receiving a signaling indicating that estimation of user assignment information is necessary. By performing such a control, it can be avoided that the user apparatus performs unnecessary user assignment information estimation processes, so that there is an effect in view of battery saving, for example.

Figure 36:
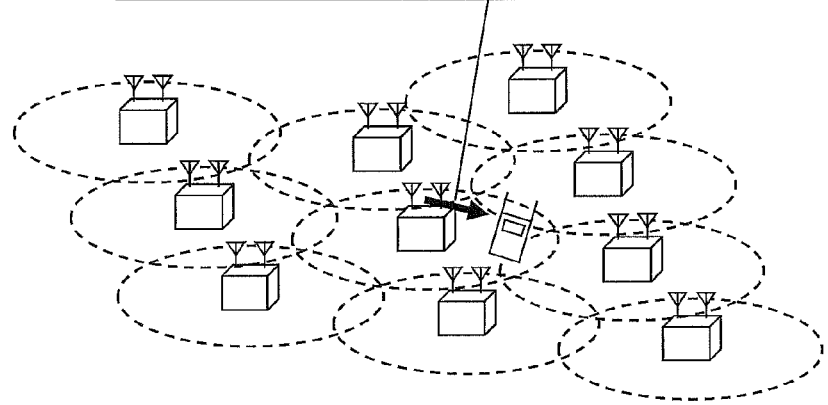
FIG. 36 is a diagram showing an example 1 of estimation necessity determination/notification for user assignment information in the third embodiment.

An example of determination and notification is described with reference to FIGS. 36 and 37. FIG. 36 shows a cell configuration of a large amount of interference (example: high-density small cell configuration). In this case, since interference reduction process is effective, the base station transmits notification of 1 bit, for example, to the user apparatus, so as to instruct the user apparatus to estimate user assignment information.

Figure 37:
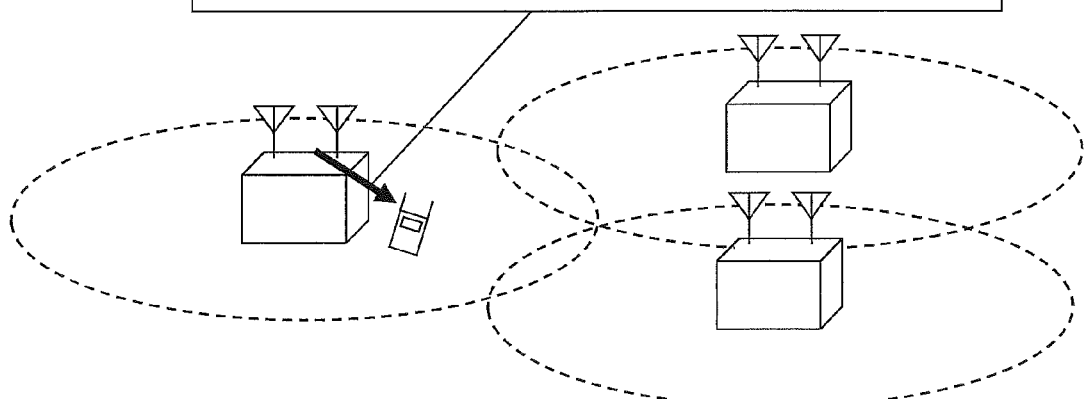
FIG. 37 is a diagram showing an example 2 of estimation necessity determination/notification for user assignment information in the third embodiment.

FIG. 37 shows a cell configuration of a small amount of interference (example: macro cell configuration). In this case, since the interference reduction process does not contribute to quality improvement very much, the base station transmits notification of 1 bit, for example, to the user apparatus, so as to instruct the user apparatus not to estimate user assignment information.

Also, the connecting base station may monitor traffic state of neighbor cells, and determine that interference reduction process is necessary when the average downlink traffic amount of the neighbor cells is equal to or greater than a threshold, so as to send the notification to the user apparatus to perform estimation of user assignment information. And, when the average downlink traffic amount of the neighbor cells is equal to or less than a threshold, the base station may not transmit the notification.

<Apparatus Configuration Example 3>

Figure 38:
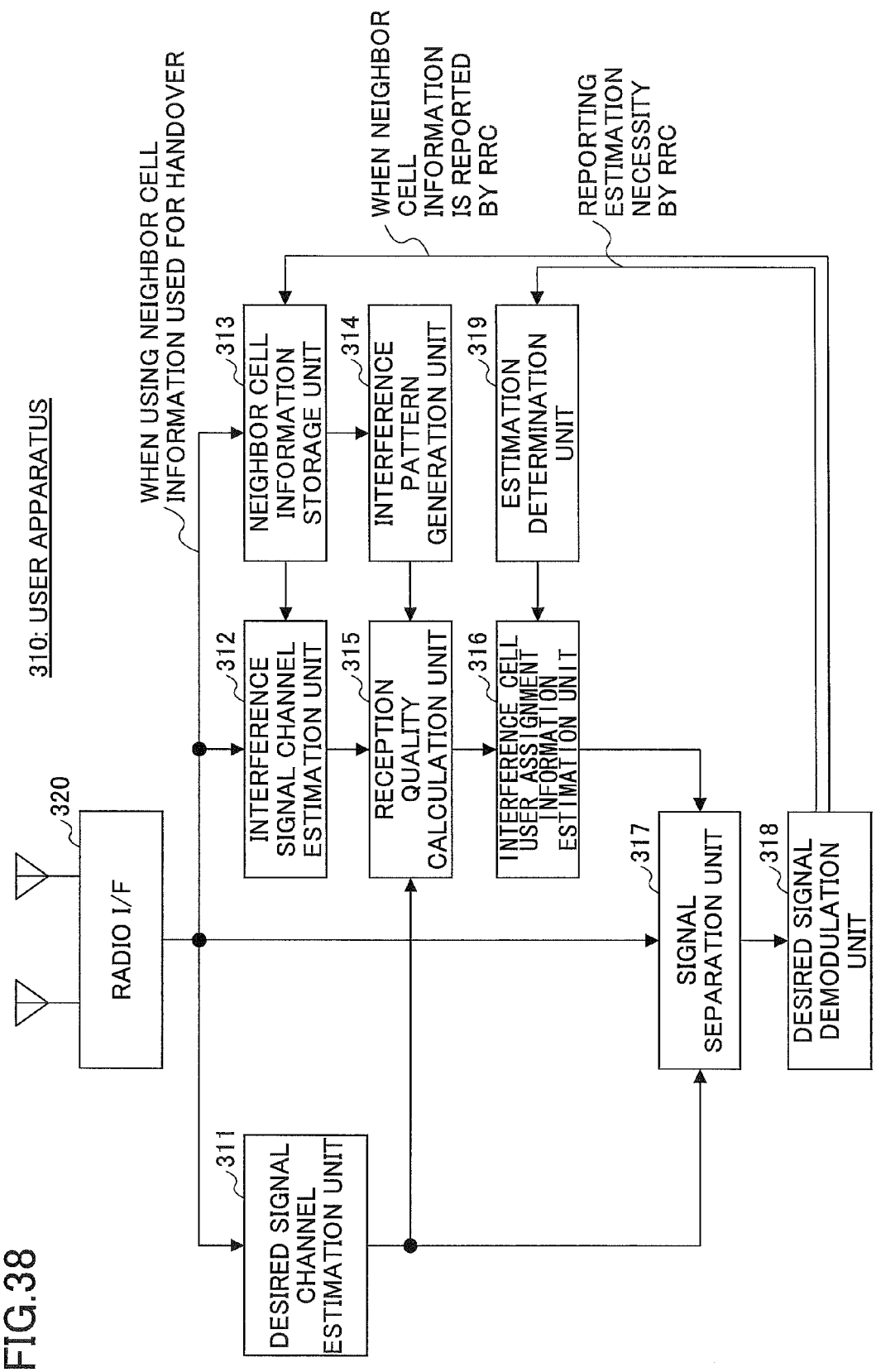
FIG. 38 is a functional block diagram of a user apparatus 310 in the third embodiment.

FIG. 38 shows a functional block diagram of the user apparatus 310 of the present embodiment. The configuration shown in FIG. 38 is a configuration obtained by adding an estimation determination unit 319 to the configuration (user apparatus 110) of the first embodiment. But, this is merely an example. The estimation determination unit 319 may be added to any user apparatus described so far. For example, the estimation determination unit 319 may be added to each of the user apparatus 110, the user apparatus 120, the user apparatus 210, the user apparatus 230, and the user apparatus 250.

As shown in FIG. 38, the user apparatus 310 includes a desired signal channel estimation unit 311, an interference signal channel estimation unit 312, a neighbor cell information storage unit 313, an interference pattern generation unit 314, a reception quality calculation unit 315, an interference cell user assignment information estimation unit 316, a signal separation unit 317, a desired signal demodulation unit 318, the estimation determination unit 319 and a radio I/F 320.

The desired signal channel estimation unit 311 performs channel estimation for a desired cell. The interference signal channel estimation unit 312 performs channel estimation for an interference cell. The neighbor cell information storage unit 313 holds neighbor cell information obtained for handover, or holds neighbor cell information reported by RRC. The neighbor cell information is used for interference signal channel estimation and interference pattern generation.

The interference pattern generation unit 314 generates a table collecting interference patterns. The reception quality calculation unit 315 calculates reception quality after interference reduction for each interference pattern of each RB. The interference cell user assignment information estimation unit 316 estimates user assignment information in the interference cells for each RB.

The signal separation unit 317 performs signal separation by using the all channel estimation results and user assignment information of interference cells. A concrete signal separation method is IRC, SIC, for example. The desired signal demodulation unit 318 demodulates a desired signal (including a control signal reported by RRC).

The estimation determination unit 319 determines whether to perform estimation of interference cell user assignment information based on information bit transmitted by RRC, for example. The estimation determination unit 319 reports the determination result to the interference cell user assignment information estimation unit 316, and the interference cell user assignment information estimation unit 316 determines whether to perform estimation or not based on the received information indicating whether to perform estimation or not.

Operation Example 3 of the Apparatus

Next, an operation example of the user apparatus 310 having the configuration shown in FIG. 38 is described with reference to FIG. 39.

The user apparatus 310 receives neighbor cell information from a connecting base station by RRC signaling, for example (step 311). In this example, further, the connecting base station determines whether to perform user assignment information estimation, and reports, to the user apparatus, information indicating whether to perform user assignment information estimation (step 312). When the information indicates not to perform user assignment information estimation, user assignment information estimation is not performed. When performing user assignment information estimation, in steps 313-318, operation similar to operation described in steps 112-117 of FIG. 19 is performed.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus has been explained by using functional block diagrams. However, the apparatus may be implemented in hardware, software, or a combination thereof. The software that operates according to the present invention (software executed by a processor provided in the user apparatus) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-71067, filed in the JPO on Mar. 29, 2013, and the entire contents of the Japanese patent application No. 2013-71067 are incorporated herein by reference.

DESCRIPTION OF REFERENCE SIGNS 110 user apparatus
111 desired signal channel estimation unit
112 interference signal channel estimation unit
113 neighbor cell information storage unit
114 interference pattern generation unit
115 reception quality calculation unit
116 interference cell user assignment information estimation unit
117 signal separation unit
118 desired signal demodulation unit
119 radio I/F
120 user apparatus
121 desired signal channel estimation unit
122 interference signal channel estimation unit
123 neighbor cell information storage unit
124 interference pattern generation unit
125 reception quality calculation unit
126 interference cell user assignment information and PMI/RI estimation unit
127 signal separation unit
128 desired signal demodulation unit
129 radio I/F 129
210 user apparatus
211 desired signal channel estimation unit
212 interference signal channel estimation unit
213 neighbor cell information storage unit
214 interference cell number restriction unit
215 interference noise power calculation unit
216 interference cell power calculation unit
217 interference cell user assignment information estimation unit
218 signal separation unit
219 desired signal demodulation unit
220 radio I/F
230 user apparatus
231 desired signal channel estimation unit
232 interference signal channel estimation unit
233 neighbor cell information storage unit
234 interference cell number restriction unit
235 covariance matrix calculation unit
236 interference cell covariance matrix calculation unit
237 interference cell user assignment information estimation unit 237
238 interference cell user assignment information and PMI/RI estimation unit
239 signal separation unit
240 desired signal demodulation unit
241 radio I/F
250 user apparatus
251 desired signal channel estimation unit
252 interference signal channel estimation unit
253 neighbor cell information storage unit
254 interference cell number restriction unit
255 interference noise power calculation unit
256 interference cell power calculation unit
257 interference pattern generation unit
258 reception quality calculation unit
259 interference cell user assignment information estimation unit
260 signal separation unit
261 desired signal demodulation unit
262 radio I/F
310 user apparatus
311 desired signal channel estimation unit
312 interference signal channel estimation unit
313 neighbor cell information storage unit
314 interference pattern generation unit
315 reception quality calculation unit
316 interference cell user assignment information estimation unit
317 signal separation unit
318 desired signal demodulation unit
319 estimation determination unit
320 radio I/F

The invention claimed is:

1. A user apparatus that is used in a radio communication system including a plurality of base stations, and that includes a function for performing interference reduction based on user assignment in an interference cell, comprising:
an interference pattern generation unit configured to generate a plurality of interference patterns each of which is a combination of presence or absence of an interference signal in a given number of interference cells for the user apparatus;
a reception quality calculation unit configured to calculate a reception quality after interference reduction for each of the plurality of interference patterns generated by the interference pattern generation unit; and
a user assignment information estimation unit configured to determine presence or absence of an interference signal in each interference cell corresponding to an interference pattern based on which the best reception quality is obtained in reception qualities calculated by the reception quality calculation unit to be present or absent of user assignment.

2. The user apparatus as claimed in claim 1, wherein the interference pattern generation unit restricts the number of interference cells for which the interference pattern is to be generated based on a size of interference power from interference cells.

3. The user apparatus as claimed in claim 2, wherein the interference pattern generation unit generates the interference pattern by further using a pattern of precoding information that can be used in an interference cell, and
the user assignment information estimation unit estimates presence or absence of the user assignment and precoding information in each interference cell.

4. The user apparatus as claimed in claim 2, wherein the user apparatus comprises an estimation determination unit configured to determine whether to perform estimation of presence or absence of user assignment based on information reported from a base station.

5. The user apparatus as claimed in claim 1, wherein the interference pattern generation unit generates the interference pattern by further using a pattern of precoding information that can be used in an interference cell, and
the user assignment information estimation unit estimates presence or absence of the user assignment and precoding information in each interference cell.

6. The user apparatus as claimed in claim 5, wherein the user apparatus comprises an estimation determination unit configured to determine whether to perform estimation of presence or absence of user assignment based on information reported from a base station.

7. The user apparatus as claimed in claim 1, wherein the user apparatus comprises an estimation determination unit configured to determine whether to perform estimation of presence or absence of user assignment based on information reported from a base station.

8. A user apparatus that is used in a radio communication system including a plurality of base stations, and that includes a function for performing interference reduction based on user assignment in an interference cell, comprising:
an interference noise power calculation unit configured to calculate a whole interference noise power for the user apparatus;
an interference cell power calculation unit configured to calculate an interference power for each of a given number of interference cells for the user apparatus;
a user assignment information estimation unit configured to compare the whole interference noise power calculated by the interference noise power calculation unit with the interference power of each interference cell calculated by the interference cell power calculation unit so as to estimate presence or absence of user assignment of each interference cell based on magnitude relation of them.

9. The user apparatus as claimed in claim 8, wherein the user apparatus comprises an interference cell number restriction unit configured to restrict the number of interference cells that become targets of interference power calculation or covariance matrix calculation based on a size of interference power from interference cells.

10. The user apparatus as claimed in claim 9, wherein the user apparatus comprises an estimation determination unit configured to determine whether to perform estimation of presence or absence of user assignment based on information reported from a base station.

11. The user apparatus as claimed in claim 8, wherein the user apparatus comprises an estimation determination unit configured to determine whether to perform estimation of presence or absence of user assignment based on information reported from a base station.

12. A user apparatus that is used in a radio communication system including a plurality of base stations, and that includes a function for performing interference reduction based on user assignment in an interference base station, comprising:
a covariance matrix calculation unit configured to calculate a covariance matrix of whole interference cells for the user apparatus;
an interference cell covariance matrix calculation unit configured to calculate a covariance matrix for each of a given number of interference cells for the user apparatus; and
a user assignment information estimation unit configured to estimate presence or absence of user assignment of each interference cell based on a result of predetermined calculation by using the covariance matrix of the whole interference cells calculated by the covariance matrix calculation unit and the covariance matrix of each interference cell calculated by the interference cell covariance matrix calculation unit.

13. The user apparatus as claimed in claim 12, wherein the interference cell covariance matrix calculation unit calculates the covariance matrix by using each of a plurality of pieces of precoding information that can be used in an interference cell, and the user assignment information estimation unit estimates presence or absence of the user assignment and the precoding information of each interference cell.

14. The user apparatus as claimed in claim 13, wherein the user apparatus comprises an interference cell number restriction unit configured to restrict the number of interference cells that become targets of interference power calculation or covariance matrix calculation based on a size of interference power from interference cells.

15. The user apparatus as claimed in claim 13, wherein the user apparatus comprises an estimation determination unit configured to determine whether to perform estimation of presence or absence of user assignment based on information reported from a base station.

16. The user apparatus as claimed in claim 12, wherein the user apparatus comprises an interference cell number restriction unit configured to restrict the number of interference cells that become targets of interference power calculation or covariance matrix calculation based on a size of interference power from interference cells.

17. The user apparatus as claimed in claim 12, wherein the user apparatus comprises an estimation determination unit configured to determine whether to perform estimation of presence or absence of user assignment based on information reported from a base station.

18. A user assignment information estimation method performed by a user apparatus that is used in a radio communication system including a plurality of base stations, and that includes a function for performing interference reduction based on user assignment in an interference cell, comprising:
an interference pattern generation step of generating a plurality of interference patterns each of which is a combination of presence or absence of an interference signal in a given number of interference cells for the user apparatus;
a reception quality calculation step of calculating a reception quality after interference reduction for each of the plurality of interference patterns generated by the interference pattern generation step; and
a user assignment information estimation step of determining presence or absence of an interference signal in each interference cell corresponding to an interference pattern based on which the best reception quality is obtained in reception qualities calculated by the reception quality calculation step to be presence or absence of user assignment.

19. A user assignment information estimation method performed by a user apparatus that is used in a radio communication system including a plurality of base stations, and that includes a function for performing interference reduction based on user assignment in an interference cell, comprising:
a power calculation step of calculating a whole interference noise power for the user apparatus, and calculating an interference power for each of a given number of interference cells for the user apparatus;
a user assignment information estimation step of comparing the whole interference noise power with the interference power of each interference cell so as to estimate presence or absence of user assignment of each interference cell based on magnitude relation of them.

* * * * *